(12) United States Patent
Werners et al.

(10) Patent No.: US 9,035,547 B2
(45) Date of Patent: May 19, 2015

(54) MARKING HAVING ELECTROLUMINESCENT LIGHTING EFFECT, METHOD FOR THE PRODUCTION THEREOF

(71) Applicants: Thilo-Josef Werners, Leverkusen (DE); Michael Heite, Olpe (DE); Helmut Mäuser, Leverkusen (DE)

(72) Inventors: Thilo-Josef Werners, Leverkusen (DE); Michael Heite, Olpe (DE); Helmut Mäuser, Leverkusen (DE)

(73) Assignee: EFL Holdings Tech B.V., GV Mill (NL)

( * ) Notice: Subject to any disclaimer, the term of this patent is extended or adjusted under 35 U.S.C. 154(b) by 0 days.

(21) Appl. No.: 13/745,215

(22) Filed: Jan. 18, 2013

(65) Prior Publication Data
US 2013/0221839 A1    Aug. 29, 2013

Related U.S. Application Data

(63) Continuation of application No. 12/675,163, filed as application No. PCT/EP2008/061126 on Aug. 26, 2008, now abandoned.

(30) Foreign Application Priority Data

Aug. 27, 2007 (DE) .......................... 10 2007 040 647

(51) Int. Cl.
*H01L 51/52* (2006.01)
*H01J 1/62* (2006.01)
(Continued)

(52) U.S. Cl.
CPC .......... *H05B 33/22* (2013.01); *B32B 17/10174* (2013.01); *B60R 13/10* (2013.01); *H05B 33/26* (2013.01); *B60R 13/105* (2013.01)

(58) Field of Classification Search
CPC ............ H01L 51/5237; H01L 51/5203; H01L 27/322; H01L 51/5012; H01L 51/5234; H01L 2251/5315; H01L 2251/5369; H01L 27/3258; H01L 51/5206; H01L 51/5212; H01L 51/5221; H01L 51/5228; H01L 2251/5361; H01L 27/1214; H01L 27/3276; H01L 27/3246; H01L 27/1266; H01L 51/56; H01L 2251/5338; H01L 27/3244; H01L 2227/323; H01L 27/1225; H01L 27/3211; H01L 29/7869; H01L 27/12; H01L 2924/00; H01L 2924/0665; H01L 2224/2919; H01L 21/6836; H01L 2221/68327; H01L 2224/27436; H01L 2224/83191; H01L 2224/8385; H01L 2224/85; H01L 2251/568; H01L 24/29; H01L 24/83; H01L 24/08; H01L 21/76251; H01L 23/3192; H01L 27/14663; H01L 51/0096; H01L 51/448; H01L 51/5068; H01L 51/5246; H05B 33/22; H05B 33/26; B32B 17/10174; B60R 13/10; B60R 13/105; C09D 157/00; G09G 2300/0426; G09G 3/30
USPC ............. 313/498–512; 40/544, 200, 204–206
See application file for complete search history.

(56) References Cited

U.S. PATENT DOCUMENTS
2,838,715 A    6/1958   Payne
(Continued)

FOREIGN PATENT DOCUMENTS
CN    1204598 A  *  1/1999
(Continued)

*Primary Examiner* — Anne Hines
*Assistant Examiner* — Jose M Diaz
(74) *Attorney, Agent, or Firm* — Drinker Biddle & Reath LLP

(57) ABSTRACT

An electroluminescent arrangement is described. This electroluminescent arrangement comprises the following functional layers: (a) rear electrode as layer A;
(b) dielectric layer as layer B;
(c) electroluminescent layer as layer C; and
(d) cover electrode as layer D.

23 Claims, 4 Drawing Sheets

(51) Int. Cl.
*H01J 63/04* (2006.01)
*H05B 33/22* (2006.01)
*B32B 17/10* (2006.01)
*B60R 13/10* (2006.01)
*H05B 33/26* (2006.01)

(56) References Cited

U.S. PATENT DOCUMENTS

| | | | |
|---|---|---|---|
| 3,680,237 A * | 8/1972 | Finnerty, Sr. | 40/544 |
| 6,248,261 B1 | 6/2001 | Takemura et al. | |
| 6,411,029 B1 | 6/2002 | Czak | |
| 7,067,071 B1 | 6/2006 | Kappe et al. | |
| 7,210,799 B2 | 5/2007 | Moser et al. | |
| 2004/0099438 A1 * | 5/2004 | Arthur et al. | 174/257 |
| 2005/0120605 A1 | 6/2005 | Fitzke et al. | |
| 2005/0150146 A1 * | 7/2005 | Moser et al. | 40/544 |
| 2005/0170152 A1 | 8/2005 | Moser | |
| 2007/0065651 A1 | 3/2007 | Glatkowski et al. | |
| 2009/0236984 A1 | 9/2009 | Werners et al. | |
| 2013/0171455 A9 * | 7/2013 | Forget | 428/424.8 |

FOREIGN PATENT DOCUMENTS

| | | |
|---|---|---|
| DE | 10238054 A1 | 3/2004 |
| DE | 102006031315 A1 | 1/2008 |
| EP | 0978220 B1 | 1/2003 |
| EP | 1463654 B1 | 10/2005 |
| WO | WO-0134723 A1 | 5/2001 |
| WO | WO-03/064210 A1 | 8/2003 |
| WO | WO-2004/048155 A1 | 6/2004 |
| WO | WO-2004/069736 A2 | 8/2004 |
| WO | WO-2004/088365 A1 | 10/2004 |
| WO | WO-2007/022226 A2 | 2/2007 |

* cited by examiner

Schnitt A-B

Ausschnitt C

Ausschnitt A

Ausschnitt B

Ausschnitt B

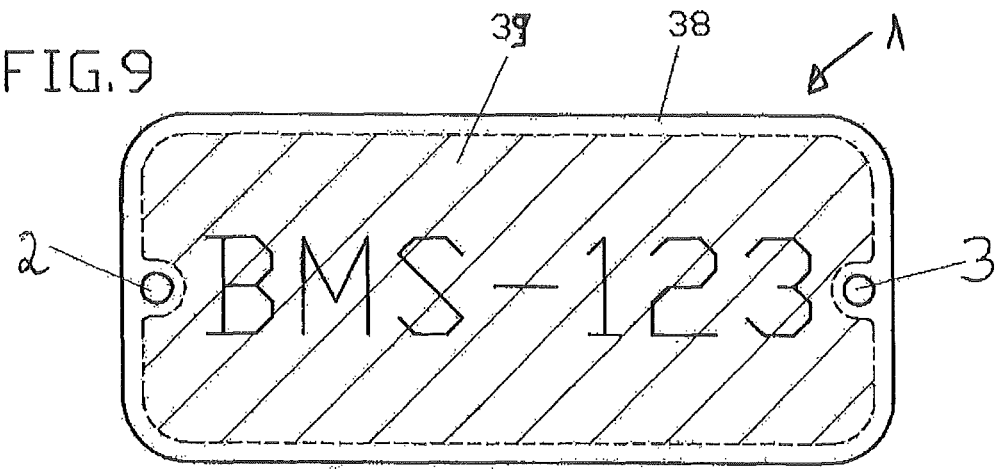
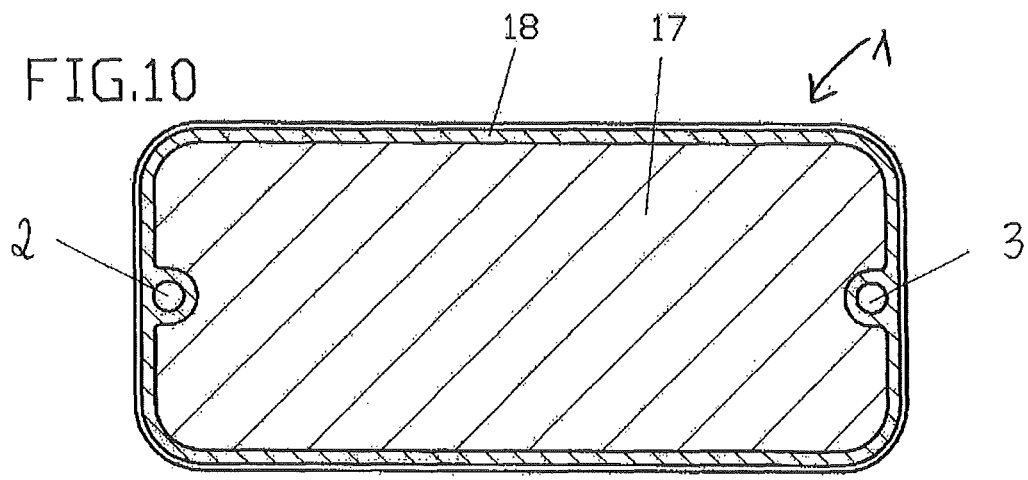
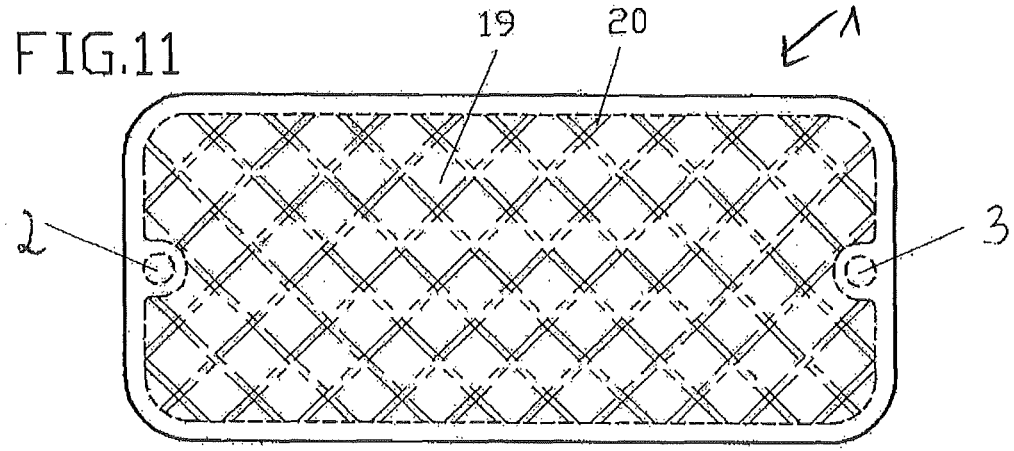

MARKING HAVING ELECTROLUMINESCENT LIGHTING EFFECT, METHOD FOR THE PRODUCTION THEREOF

CROSS-REFERENCE TO RELATED APPLICATIONS

This application is a continuation application of U.S. patent application Ser. No. 12/675,163, filed Feb. 25, 2010, which is a national stage application (under 35 U.S.C. §371) of PCT/EP2008/061126, filed Aug. 26, 2008, which claims benefit of German application 10 2007 040 647.0, filed Aug. 27, 2007.

BACKGROUND OF THE INVENTION

The present invention relates to electroluminescent arrangements, a process for their production, as well as their use in particular as distinguishing/identification signs for vehicles. The invention also provides a front diaphragm blank as well as a process for its production.

Electroluminescence (hereinafter also abbreviated to "EL") is understood to mean the direct excitation of luminescence from luminescent pigments or luminophores by an alternating electric field.

Electroluminescence technology has recently become increasingly important. This technology enables homogeneous luminous surfaces free of dazzle and shadow and of virtually any desired size to be formed. At the same time the power consumption and structural thickness (of the order of magnitude of a millimetre or less) are extremely low. Typical uses include, apart from the background illumination of liquid crystal displays, the back-lighting of transparent films that are provided with lettering and/or image motifs. Thus, transparent electroluminescent arrangements, for example electroluminescent luminous boards based on glass or transparent plastics, which can serve for example as information carriers, advertising panels, or for decorative purposes, are known from the prior art.

A zinc sulfide electroluminescent arrangement based on the use of two electrodes of conducting glass with an electroluminescent phosphor arranged therebetween was already described in 1950 by E. C. Payne in U.S. Pat. No. 2,838,715, and a publication by G. Destriau "The New Phenomenon of Electroluminescence and its Possibilities for the Investigation of Crystal Lattice" in the "Philosophical Magazine" was mentioned by way of reference, in which connection the original discovery of the particular ZnS EL phenomenon in an alternating voltage field was already made by Destriau in 1936.

The luminescent pigments and luminophores that are used in these EL elements are embedded in a transparent, organic or ceramic binder. The starting substances are generally zinc sulfides, which depending on doping or co-doping and preparation procedure generate different, relatively narrow-band emission spectra. The reason for the use of zinc sulfides in the EL layers is due on the one hand to the relatively large number of zinc sulfide EL pigments that are available. The centre of gravity of the spectrum at the same time determines the respective colour of the emitted light. The emission colour of an EL element can be matched by means of a large number of possible measures to the desired colour impression. These measures includes the doping and co-doping of the luminescent pigments, the mixing of two or more EL pigments, the addition of one or more organic and/or inorganic colour-converting and/or colour-filtering pigments, the coating of the EL pigment with organic and/or inorganic colour-converting and/or colour-filtering substances, the admixture of colorants to the polymer matrix in which the luminescent pigments are dispersed, as well as the incorporation of a colour-converting and/or colour-filtering layer or film in the structure of the EL element. In general, depending on the employed doping and co-doping of the zinc sulfide pigments a relatively broad-band emission spectrum is produced if a suitably high alternating voltage of normally greater than 50 volts up to more than 200 volts and a frequency of greater than 50 Hz up to a few kHz, normally in the range from 400 Hz to 2 kHz, is applied.

In order that the produced emission can be seen, at least one flat (planar) electrode is preferably designed to be largely transparent.

Depending on the intended use and production technology, glass substrates or polymeric films with an electrically conducting and largely transparent coating can be used for this purpose. In special embodiments an EL capacitor structure can also be arranged on a substrate in such a way that as front transparent electrode only a thin layer is printed or knife coated, or applied by a roller coating method, a curtain casting method or a spray method. In principle both flat electrodes can also be made largely transparent and in this way a translucent EL element is formed that exhibits a light emission on both sides.

Electroluminescent arrangements are used for example in the field of self-luminescent number plates for vehicles.

Self-luminescent number plates (abbreviation "SLN"), also termed "self-luminescent distinguishing signs" or "self-luminescent distinguishing plates", are vehicle distinguishing signs that do not have to be illuminated in the dark by an external light source in order that they can be read, but emit light themselves.

At the present time there exist two different types of self-luminescent number plates which are commercially available:

In one type of self-luminescent number plates the lettering is produced by embossing a translucent, white reflecting plastics plate, behind which are arranged white LEDs. For this system, which was developed by the 3M® company, a general model and design approval (ABG) was granted by the German Federal Highways Authority on 10 Jul. 2006.

In a second type of self-luminescent number plates the lettering is printed on a transparent film, which in turn is bonded to an electroluminescent film. The electroluminescent film lights up when an electrical voltage is applied to the film. Number plates according to this principle have likewise been authorised by the German Federal Highways Authority (ABG K55 of 27 Feb. 2007).

Corresponding electroluminescent systems are also known from the printing technology prior art.

For example, from WO 03/064210 A1 a plate, in particular an identification or number plate for vehicles, with a base body is known, wherein the base body consists of an electrically conducting material or comprises an electrically conducting coating to form a first electrode directly or via a further layer. A coating containing electroluminescent pigmentation is applied to the base body or to the electrically conducting coating, which pigmented coating is in turn covered with an electrically conducting transparent layer to form a second electrode. The base body or the base body with the electroluminescent layer and the electrically conducting transparent layer for forming the second electrode can be shaped, and in particular can be embossed.

In EP 1 463 654 A1 a plate, in particular a vehicle identification plate, is described, which comprises a support made of a plastically deformable material, for example of metal, and an electroluminescent layer structure so as to form at least one flat capacitor. The electroluminescent layer structure has a base electrode, an insulating layer, a pigment layer that luminesces in operation, and a transparent cover electrode. A further insulating layer is applied to the support, above which insulating layer is arranged an electrically conducting layer from which are fashioned the base electrode and at least one power supply lead, electrically separate therefrom, for the cover electrode of the at least one flat capacitor. The further insulating layer is a plastics film that is first of all continuously coated with an electrically conducting material on the side facing away from the support, the said insulating layer having a bracket projecting beyond the support and on which are formed the connection leads necessary for the contacting of the base electrode and the power supply lead.

In EP 0 978 220 A a plastics moulded article with an EL thick-film element is described, wherein this EL thick-film element is three-dimensionally shaped and sprayed on the back with thermoplastic material at an operating temperature below the softening point of the film, and in this way a three-dimensional self-luminescent moulded article is produced.

In German Patent Application DE 10 2006 031 315 of earlier priority date but not prior-published, entitled "3D-EL-HDVF element and production process and use", a process is described for the production of a three-dimensionally shaped and graphically configured plastics film element consisting of at least one graphically configured plastics film cold-stretchable below the softening point and at least one protective film element, wherein the originally flat and cold-stretchable film with the various cold-stretchable graphical printing together with at least one protective film is moved in an isostatic high-pressure shaping tool, and at a process temperature below the softening point of the plastics film is three-dimensionally shaped in a stress-whitening-free manner with a fluid compression agent at a pressure greater than 20 bar, is at the same time laminated, and is then cut along the edges. In addition the graphical printing is provided with functional properties like an inorganic printable electroluminescent layer sequence.

These distinguishing signs with an electroluminescent effect known from the prior art still have disadvantages in many respects.

Thus, the distinguishing signs with an electroluminescent effect known from the prior art all have the disadvantage that a simple, secure and easily applicable contacting of the distinguishing sign with for example the electrical circuit of the vehicle is not possible. For example, the contacting device described in the aforementioned EP 1 463 654 A and designed as a bracket is complicated to produce. In addition this bracket interferes in the further processing, in particular in the lamination. The cost-effective roll-to-roll lamination process is difficult to execute in this form of implementation, since in this process the bracket is located in the contact region between two endless supports and would have to be machined out in a complicated procedure only later. Furthermore the exposure of the bracket necessitates the provision of diffusion barriers against moisture, since the luminophores are sensitive to moisture and the conducting parts suffer from electrical corrosion under the action of moisture.

Moreover, corresponding distinguishing signs with an electroluminescent effect are often also shaped three-dimensionally, such as for example in the embossing of a distinguishing sign for a vehicle. As a result the electrically conducting coatings can fracture and break, especially in the electrodes. These fractures can mean that electrical conductivity is not ensured over the whole electrode.

Quite apart from this, the cold working property (formability) of corresponding electroluminescent elements is generally not always satisfactorily achieved.

With the automobile distinguishing signs having an electroluminescent effect known from the prior art, in addition the bonding to the substrates is not satisfactorily achieved. Thus, corresponding transitions between the electroluminescent arrangement and substrate in the systems known from the prior art are neither sufficiently stable nor sufficiently durable. Moreover, the transitions do not exhibit adequate shaping properties, which is essential of course especially when embossing automobile distinguishing signs with electroluminescent effects. For example, when embossing an automobile distinguishing sign an embossing of two angles of 90° at a height of 2 mm is generally necessary. In addition the reflecting properties of the automobile distinguishing signs with an electroluminescent property known from the prior art also need to be improved.

Accordingly, the present invention is involved with the object of improving electroluminescent arrangements of the aforementioned type in various respects, especially in the areas identified above as critical.

This object is achieved by the electroluminescent arrangement according to the invention.

BRIEF SUMMARY OF THE INVENTION

The electroluminescent arrangement according to the invention is characterised in that the arrangement comprises the following functional layers:
(a) Rear electrode as component BE;
(b) dielectric layer as component BD;
(c) electroluminescent layer as component BC; and
(d) cover electrode (=front electrode) as component BA.

The electroluminescent arrangement according to the invention is based in general on an inorganic thick-film AC system, which can be produced for example using conventional flat bed and/or cylinder silk-screen printing machines. The production of the electroluminescent arrangement according to the invention is thus possible in a simple manner using conventional and available equipment.

The structural arrangement of the electroluminescent element according to the invention is described in more detail hereinafter.

The electroluminescent element according to the invention comprises at least one EL layer as layer BC. The layer BC can also be formed from several layers having an electroluminescent effect. The at least one electroluminescent layer (component BC) is generally arranged between the cover electrode (component BA) and the dielectric layer (component BD). In this connection the electroluminescent layer can be arranged immediately adjacent to the dielectric layer (component BD) or optionally one or more further layers can be arranged between the dielectric layer (component BD) and the electroluminescent layer (component BC). Preferably the electroluminescent layer (component BC) is arranged immediately adjacent to the dielectric layer (component BD).

In a further embodiment of the present invention the at least one electroluminescent layer (component BC) is generally arranged between the rear electrode (component BA) and the dielectric layer (component BD). In this connection the electroluminescent layer can be arranged immediately adjacent to the dielectric layer (component BD) or optionally one or more further layers can be arranged between the dielectric layer (component BD) and the electroluminescent layer (component BC). Preferably the electroluminescent layer (component BC) is arranged directly adjacent to the dielectric layer (component BD).

Moreover, in the electroluminescent arrangement according to the invention it is possible for the electroluminescent layer to consist of two or more electroluminescent layer elements arranged next to one another and having different electroluminescent phosphor pigments, so that it is possible to produce different colours on the electroluminescent arrangement.

In a further configuration the partial regions of the electroluminescent surfaces can optionally be formed differently, for example as regards their composition, and can optionally be operated separately from one another. In this way different emission colours can be generated.

A BRIEF DESCRIPTION OF THE FIGURES

FIG. 9 illustrates a self-luminescent automobile distinguishing sign with the alphanumeric identification "BMS-123" by way of example in plan view.

FIG. 10 illustrates diagrammatically in plan view the self-luminescent distinguishing sign.

FIG. 11 illustrates diagrammatically in plan view the self-luminescent distinguishing sign and in this connection simply the rear electrode with the grid-like busbar

DETAILED DESCRIPTION OF THE INVENTION

Figure 1:
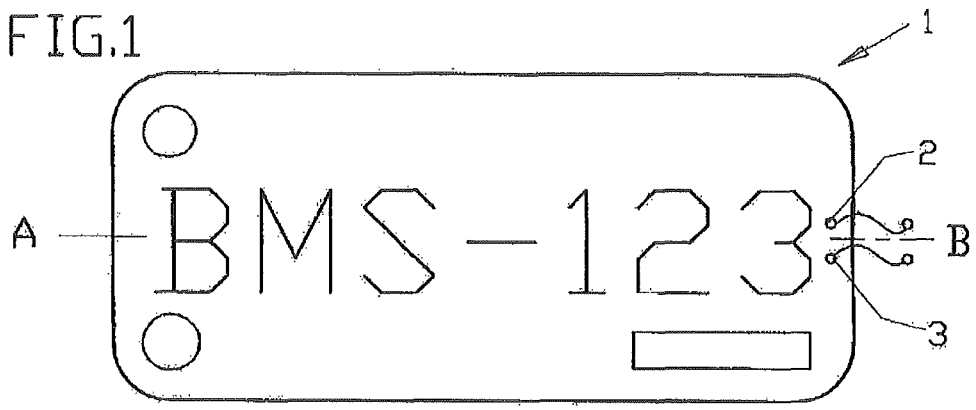
FIG. 1 illustrates a self-luminescent automobile distinguishing sign with the alphanumeric identification "BMS-123" shown by way of example in plan view.

Structure of Electroluminescent Arrangements According to the Invention:

In a first particularly preferred embodiment of the present invention the electroluminescent arrangement consists of the following layers (normal structure):
  a) an at least partially transparent substrate, component A,
  b) at least one electroluminescent arrangement, component B, applied to the substrate and containing the following components
    ba) an at least partially transparent electrode, component BA, as front electrode,
    bb) optionally an insulating layer, component BB,
    bc) a layer containing at least one luminous pigment (electroluminophore, El Phosphor) excitable by an electrical field, termed an electroluminescent layer or pigment layer, component BC,
    bd) optionally an insulating layer, component BD,
    be) a rear electrode, component BE, which can be at least partially transparent,
    bf) a conducting track or a plurality of conducting tracks, component BF, for the electrical contacting of both component BA as well as component BE, wherein the conducting track or the conducting tracks can be applied before, after or between the electrodes BA and BE, the conducting track or the conducting tracks preferably being applied in one work step. The conducting track or conducting tracks can be applied in the form of a silver bus, preferably produced from a silver paste,
      a graphite layer can possibly also be applied before the application of the silver bus
  c) a protective layer, component CA, or a film, component CB.

The insulating layers BB and BD can be non-transparent, opaque or transparent, in which connection at least one of the layers must be at least partially transparent if two insulating layers are present.

Also, one or more at least partially transparent graphically configured layers can be arranged externally on the substrate A and/or between the substrate A and the electroluminescent arrangement.

Also, UV-blocking substances can be applied to and/or incorporated in one arbitrary side or on both sides of the substrate as well as in the substrate itself. In this way the service life of the luminophores can be significantly extended; in particular the bleaching out or fading of organic conversion pigments can thereby be dramatically slowed down.

Apart from the aforementioned layers (components A, B and C) the electroluminescent element according to the invention (conventional structure) can comprise one or more reflecting layers. The reflecting layer or layers can in particular be arranged as follows:
  externally on the component A,
  between the component A and component BA,
  between the component BA and component BB, or BC if there is no component BB,
  between the component BD and component BE,
  between the component BE and component BF,
  between the component BF and component CA or CB,
  externally on the component CA or CB.

Preferably the reflecting layer, where present, is arranged between the component BC and BD, or BE if there is no component BD.

The reflecting layer preferably includes glass spheres, in particular hollow glass spheres. The diameter of the glass spheres can vary within wide ranges. For example, they can have a size $d_{50}$ of in general 5 µm to 3 mm, preferably 10 to 200 µm, particularly preferably 20 to 100 p.m. The hollow glass spheres are preferably embedded in a binder. In addition the reflecting layer can contain metal particles; in this embodiment the reflecting layer is preferably arranged externally on the component A and/or between the component A and component BA.

In an alternative embodiment of the present invention the electroluminescent element consists of the following layers (reverse layer structure):
  a) an at least partially transparent substrate, component A,
  b) at least one electroluminescent arrangement, component B, applied to the substrate and containing the following components
    be) a rear electrode, component BE, that can be at least partially transparent,
    bb) optionally an insulating layer, component BB,
    bc) a layer containing at least one luminous pigment (electroluminophore) that can be excited by an electrical field, called the electroluminescent layer or pigment layer, component BC,
bd) optionally an insulating layer, component BD,
ba) an at least partially transparent electrode, component BA, as front electrode,
bf) a conducting track or plurality of conducting tracks, component BF, for the electrical contacting of component BA as well as of component BE, wherein the conducting track or conducting tracks can be applied before, after or between the electrodes BA and BE, wherein preferably the conducting track or conducting tracks are applied in one work step. The conducting track or conducting tracks can be applied in the form of a silver bus, preferably produced from a silver paste. A graphite layer can possibly also be applied before the application of the silver bus,
c) an at least partially transparent protective layer, component CA and/or a film, component CB.

Also, one or more at least partially transparent graphically configured layers can be arranged on the transparent protective layer C and/or between the transparent protective layer C and the EL arrangement. In particular, the graphically configured layers can take over the function of the protective layer.

In addition to the aforementioned layers (components A, B and C) the electroluminescent element according to the invention with a reverse layer structure can include one or more reflecting layers. The reflecting layer or layers can in particular be arranged as follows:
externally on component A,
between component A and component BE,
between component BE and component BB,
between component BB and component BC,
between component BC and component BD,
between component BD and component BA,
between component BA and component BF,
between component BF and component CA or CB,
on component CA or CB.

Preferably the reflecting layer, where present, is arranged between component BC and component BB, or BE if component BB is not present. Also, the reflecting layer can contain metal particles; in this embodiment the reflecting layer is preferably arranged externally on the component A and/or between the component A and component BE.

For the person skilled in the art it is obvious that the particular embodiments and features mentioned for the conventional structure apply as appropriate, unless otherwise stated, to the reverse layer structure and to the double-sided structure.

The one or more insulating layer(s) BB and/or BD in both the conventional structure as well as in the reverse structure can in particular be omitted if the component BC has a layer thickness that prevents a short circuit between the two electrodes, i.e. components BA and BE.

The individual function layers of the EL arrangements according to the invention are described in more detail hereinafter:

(1) Electroluminescent Layer

The EL element according to the invention includes at least one EL layer, component BC. The at least one EL layer can be arranged on the whole internal surface of the first partially transparent electrode or on one or more partial surfaces of the first at least partially transparent electrode. In the case where the EL layer is arranged on several partial surfaces, the partial surfaces generally have a mutual interspacing of 0.5 to 10.0 mm, preferably 1 to 5 mm.

The EL layer is in general composed of a binder matrix with EL pigments homogeneously dispersed therein. The binder matrix is generally chosen so as to produce a good adhesive bonding to the electrode layer (or to the dielectric layer optionally applied thereto). In a preferred configuration systems based on PVB (polyvinyl butyral) or PU (polyurethane) are in this connection used for the binder system. In addition to the EL pigments optionally further additives may also be present in the binder matrix, such as colour-converting organic and/or inorganic systems, colorant additives for a daytime and nighttime light effect and/or reflecting and/or light-absorbing effect pigments such as aluminium flakes, glass flakes or mica platelets.

Preferably the at least one EL layer BC is an alternating current thick-film powder electroluminescent (AC-P-EL) luminous structure.

In general the proportion of electroluminescent pigments in the total mass of the electroluminescent layer (degree of filling) is 20 to 75 wt. %, preferably 50 to 70 wt. %.

The electroluminescent pigments used in the electroluminescent layer have in general a thickness of 1 to 50 µm, preferably 5 to 25 µm.

Thick-film AC-EL systems have been well known since Destriau in 1947, and are applied to ITO-PET films generally by means of screen printing. Since zinc sulfide electroluminophores experience a very high degradation in operation and specifically at elevated temperatures and in a water vapour atmosphere, nowadays in general microencapsulated EL pigments are used for long-life thick-film AC-EL lamp structures. It is however also possible to use non-microencapsulated pigments in the EL element according to the invention, as is discussed further hereinafter.

EL elements are understood in the context of the present invention to mean thick-film EL systems that are operated by means of alternating voltage at normally 100 volts and 400 Hz and in this way emit a so-called cold light of a few $cd/m^2$ up to several 100 $cd/m^2$ or more. EL screen printing pastes are generally used in such inorganic thick-film alternating voltage EL elements.

Such EL screen printing pastes are generally formulated on the basis of inorganic substances. Suitable substances are for example highly pure ZnS, CdS, $Zn_xCd_{1-x}S$ compounds of groups II and IV of the Periodic System of the Elements, ZnS being particularly preferably used. The aforementioned substances can be doped or activated and optionally also co-activated. Copper and/or manganese for example are used for the doping. The co-activation is carried out for example with chlorine, bromine, iodine and aluminium. The content of alkali metals and rare earth metals in the aforementioned substances is generally very low, if these are present at all. Most particularly preferably ZnS is used, which is preferably doped or activated with copper and/or manganese and is preferably co-activated with chlorine, bromine, iodine and/or aluminium.

Normal EL emission colours are yellow, orange, green, green-blue, blue-green and white, the emission colours white or red being able to be obtained by mixtures of suitable EL phosphors (pigments) or by colour conversion. The colour conversion can generally be implemented in the form of a converting layer and/or by admixture of appropriate dyes and pigments in the polymeric binder of the screen printing inks or in the polymeric matrix in which the EL pigments are incorporated.

If the electroluminescent arrangement according to the invention is used in a distinguishing sign for vehicles, it is preferred that the electroluminescent arrangement emits the colour white.

In a further embodiment of the present invention the screen printing matrix used for the production of the EL layer is provided with glazing, colour-filtering or colour-converting dyes and/or pigments. The emission colour white or a day/night light effect can be generated in this way. In a further embodiment pigments are used in the EL layer that have an emission in the blue wavelength range from 420 to 480 nm and are provided with a colour-converting microencapsulation. The colour white can be emitted in this way.

In one embodiment, as pigments in the EL layer AC-P-EL pigments are used that have an emission in the blue wavelength range from 420 to 480 nm. In addition the AC-P-EL screen printing matrix preferably contains wavelength-converting inorganic fine particles based on europium(II)-activated alkaline earth orthosilicate luminous pigments such as $(Ba, Sr, Ca)_2SiO_4:Eu^{2+}$ or YAG luminous pigments such as $Y_3Al_5O_{12}:Ce^{3+}$ or $Tb_3Al_5O_{12}:Ce^{3+}$ or $Sr_2GaS_4:Eu^{2+}$ or $SrS:Eu^{2+}$ or $(Y,Lu,Gd,Tb)_3(Al,Sc,Ga)_5O_{12}:Ce^{3+}$ or $(Zn,Ca,Sr)(S,Se):Eu^{2+}$. A white emission can also be achieved in this way.

Corresponding to the prior art the aforementioned EL pigments can be microencapsulated. Due to the inorganic microencapsulation techniques good half-life times can be achieved. The EL screen printing system Luxprint® for EL from E.I. du Pont de Nemours and Companies may be mentioned here by way of example. Organic microencapsulation techniques and film-wrap laminates based on the various thermoplastic films are in principle also suitable, but have however proved to be expensive and do not significantly prolong the service life.

Suitable zinc sulfide microencapsulated EL luminous pigments are available from Osram Sylvania, Inc. Towanda under the trade names GlacierGLO™ Standard, High Brite and Long Life, and from the Durel Division of the Rogers Corporation under the trade names 1PHS001® High-Efficiency Green Encapsulated EL Phosphor, 1PHS002® High-Efficiency Blue-Green Encapsulated EL Phosphor, 1PHS0030 Long-Life Blue Encapsulated EL Phosphor, 1PHS004® Long-Life Orange Encapsulated EL Phosphor.

The mean particle diameters of the suitable microencapsulated pigments in the EL layer are in general 15 to 60 µm, preferably 20 to 35 µm.

Non-microencapsulated fine grain EL pigments, preferably with a high service life, can as already mentioned also be used in the EL layer of the EL element according to the invention. Suitable non-microencapsulated fine grain zinc sulfide electroluminescent phosphors are disclosed for example in U.S. Pat. No. 6,248,261 and in WO 01/34723. These preferably have a cubic crystal lattice structure. The non-microencapsulated pigments preferably have mean particle diameters of 1 to 30 µm, particularly preferably 2 to 15 µm, most particularly preferably 5 to 10 µm.

Specifically, non-microencapsulated EL pigments with smaller pigment dimensions down to below 10 µm can be used.

Thus, unencapsulated pigments can be admixed with the suitable screen printing inks according to the present invention, preferably having regard to the special hygroscopic properties of the pigments, preferably the ZnS pigments. In this connection in general binders are used that on the one hand have a good adhesion to so-called ITO layers (indium-tin oxide layers) or to intrinsically conducting polymeric transparent layers, and that on the other hand have a good insulating effect, strengthen the dielectric and thereby effect an improvement of the breakdown strength at high electric field strengths, and in addition in the cured state exhibit a good water vapour barrier effect and additionally protect the EL pigment and prolong the service life.

In one embodiment of the present invention pigments that are not microencapsulated are used in the AC-P-EL luminous layer.

The half-life times of the suitable pigments in the electroluminescent layer, i.e. the time during which the initial brightness of the electroluminescent element according to the invention has fallen by half, are in general at 100 volts and 80 volts and 400 Hz, 400 hours up to 5,000 hours, specifically 1,000 to 3,500 hours.

The brightness values (EL emission) are in general 1 to 200 $cd/m^2$, preferably 3 to 100 $cd/m^2$, particularly preferably 5 to 40 $cd/m^2$; with large luminous surface areas the brightness values are preferably in the range from 1 to 50 $cd/m^2$.

Pigments with longer or shorter half-life times and higher or lower brightness values can however also be used in the EL layer of the EL element according to the invention.

In a further embodiment of the present invention the pigments present in the EL layer have such a small mean particle diameter, or such a low degree of filling in the EL layer, or the individual EL layers are configured geometrically so small, or the interspacing of the individual layers is chosen so large, that the EL element in the case of non-electrically activated luminous structures is configured to be at least partially transparent or to ensure transmissibility. Suitable pigment particle diameters, degrees of filling, dimensions of the luminous elements and interspacings of the luminous elements have been mentioned hereinbefore.

The layer contains the aforementioned, optionally doped ZnS crystals, preferably microencapsulated as described above, preferably in an amount of 40 to 90 wt. %, more preferably 50 to 80 wt. %, particularly preferably 55 to 70 wt. %, in each case referred to the weight of the paste. One-component and preferably two-component polyurethanes can be used as binder. Preferred according to the invention are highly flexible materials from Bayer MaterialScience AG, for example the lacquer raw materials of the Desmophen and Desmodur ranges, preferably Desmophen and Desmodur, or the lacquer raw materials of the Lupranate, Lupranol, Pluracol or Lupraphen ranges from BASF AG. As solvents, ethoxypropyl acetate, ethyl acetate, butyl acetate, methoxypropyl acetate, acetone, methyl ethyl ketone, methyl isobutyl ketone, cyclohexanone, toluene, xylene, solvent naphtha 100 or arbitrary mixtures of two or more of these solvents can be used in amounts of preferably 1 to 50 wt. %, preferably 2 to 30 wt. %, particularly preferably 5 to 15 wt. %, in each case referred to the total amount of paste. Furthermore other highly flexible binders, for example those based on PMMA, PVA, in particular mowiol and poval from Kuraray Europe GmbH (now called Kuraray Specialties) or polyviol from Wacker AG, or PVB, in particular mowital from Kuraray Europe GmbH (B 20 H, B 30 T, B 30 H, B 30 HH, B 45 H, B 60 T, B 60 H, B 60 HH, B 75 H), or pioloform, in particular pioloform BR18, BM18 or BT18, from Wacker AG, can be used. When using polymeric binders such as for example PVB, solvents such as methanol, ethanol, propanol, isopropanol, diacetone alcohol, benzyl alcohol, 1-methoxypropanol-2, butyl glycol, methoxybutanol, dowanol, methoxypropyl acetate, methyl acetate, ethyl acetate, butyl acetate, butoxyl, glycolic acid n-butyl ester, acetone, methyl ethyl ketone, methyl isobutyl ketone, cyclohexanone, toluene, xylene, hexane, cyclohexane, heptane as well as mixtures of two or more of the aforementioned solvents can furthermore be added in amounts of 1 to 30 wt. % referred to the total weight of the paste, preferably 2 to 20 wt. %, particularly preferably 3 to 10 wt. %.

In addition 0.1 to 2 wt. % of additives can be included in order to improve the flow behaviour and the flow. Examples of flow improvers are Additol XL480 in butoxyl in a mixing ratio of 40:60 to 60:40. As further additives 0.01 to 10 wt. %, preferably 0.05 to 5 wt. %, particularly preferably 0.1 to 2 wt. %, in each case referred to the total weight of the paste, of rheology additives can be included, which reduce the settling behaviour of pigments and fillers in the paste, for example BYK 410, BYK 411, BYK 430, BYK 431 or arbitrary mixtures thereof.

Particularly preferred formulations according to the invention of printing pastes for the production of the EL luminous pigment layer as component BC contain:

| Substance | Content/ wt. % | Content/ wt. % | Content/ wt. % | Content/ wt. % |
|---|---|---|---|---|
| Pigment (Osram Sylvania) | 55.3 | 69.7 | 64.75 | 65.1 |
| Desmophen D670 (BMS) | 18.5 | 11.9 | 12.7 | 13.1 |
| Desmodur N75 MPA (BMS) | 16.0 | 9.0 | 12.4 | 11.3 |
| Ethoxypropyl acetate | 9.8 | 9.1 | 9.9 | 10.2 |
| Additol XL480 (50 wt. % in butoxyl) | 0.4 | 0.3 | 0.25 | 0.3 |

| Substance | Content/ wt. % | Content/ wt. % | Content/ wt. % |
|---|---|---|---|
| Pigment (Osram Sylvania) | 61.2 | 65.1 | 69.7 |
| Desmophen D670 (BMS) | 15.2 | 12.7 | 11.9 |
| Desmodur N75 MPA (BMS) | 13.1 | 11.4 | 9.0 |
| Methoxypropyl acetate | 10.2 | 5.5 | 4.9 |
| Ethoxypropyl acetate | 0 | 5 | 4.2 |
| Additol XL480 (50 wt. % in butoxyl) | 0.3 | 0.3 | 0.3 |

| Substance | Content/ wt. % | Content/ wt. % |
|---|---|---|
| Pigment (Osram Sylvania) | 61.2 | 69.7 |
| Desmophen 1800 (BMS) | 17.7 | 14.1 |
| Desmodur L67 MPA/X (BMS) | 9.9 | 7.9 |
| Ethoxypropyl acetate | 10.8 | 8.0 |
| Additol XL480 (50 wt. % in butoxyl) | 0.4 | 0.3 |

In a further, particularly preferred embodiment the electroluminescent layer in the electroluminescent arrangement is based on an electroluminescent phosphor emitting the colour green and on colour conversion pigments that are homogeneously dispersed in the electroluminescent layer. Suitable colour conversion pigments for this purpose are for example "EL Color Converting Pigments FA-000 Series" from the Sinloihi Co., Ltd. Japan. It is also possible to admix a colour-converting substance such as rhodamine, so that a white emission is obtained. The electroluminescence emission in the region of the colour white is particularly preferred if the electroluminescent arrangement is used in an identification plate for vehicles.

In addition, all commercially available EL pastes that possess the necessary forming/shaping properties can be used to produce the EL layer. In particular the paste systems from Dupont are suitable, especially those from the Luxprint range.

Electrodes

The EL element according to the invention comprises a first, at least partially transparent, front electrode BA and a second electrode, the rear electrode BE.

The expression "at least partially transparent" is understood in the context of the present invention to denote an electrode that is constructed of a material that has a transmission of in general more than 60%, preferably more than 70%, particularly preferably more than 80% and especially more than 90%.

The rear electrode BE need not necessarily be transparent.

Suitable electrically conducting materials for the electrodes are known to the person skilled in the art. In principle several types of electrodes are available for the production of thick-film EL elements exhibiting alternating voltage excitation. These include on the one hand indium-tin oxide electrodes (indium-tin oxides, ITO) applied by sputtering or vapour deposition to plastics films. They are extremely thin (a few 100 Å) and have the advantage of a high transparency combined with a relatively low sheet resistance (ca. 60 to 600Ω).

Furthermore printing pastes with ITO or ATO (indium-tin oxides, antimony-tin oxide) or intrinsically conducting transparent polymer pastes can be used, from which flat electrodes can be produced by means of screen printing. At a thickness of ca. 5 to 20 µm such electrodes have only a relatively small transparency with a high sheet resistance (up to 50 kΩ). They can be applied largely in any desired structural shape, and indeed also on structured surfaces. In addition they have a relatively good laminability. Also, non-ITO screen printing layers (wherein the term "non-ITO" includes all screen printing layers that are not based on indium-tin oxide (ITO)), in other words intrinsically conducting polymeric layers with normally nanoscale electrically conducting pigments, for example the ATO printing pastes with the designations 7162E or 7164 from DuPont, the intrinsically conducting polymer systems, such as the Orgacon® system from Agfa, the Baytron® poly-(3,4-ethylenedioxythiophene) system from H. C. Starck GmbH, the Ormecon system termed organic metal (PEDT-conductive polymer polyethylene-dioxythiophene), conducting coating or printing paste systems from Panipol OY and optionally with highly flexible binders, for example based on PU (polyurethanes), PMMA (polymethyl methacrylate), PVA (polyvinyl alcohol), or modified polyaniline, can be used. Preferably the Baytron® poly-(3,4-ethylenedioxythiophene) system from H. C. Starck GmbH is used as the material of the at least partially transparent electrode of the electroluminescent element. Examples of electrically conducting polymer films are polyanilines, polythiophenes, polyacetylenes, polypyrroles (Handbook of Conducting Polymers, 1986), with and without a metal oxide filling.

According to the invention, 10 to 90 wt. %, preferably 20 to 80 wt. %, particularly preferably 30 to 65 wt. %, in each case referred to the total weight of the printing paste, of Clevios P, Clevios PH, Clevios P AG, Clevios P HCV4, Clevios P HS, Clevios PH 500, Clevios PH 510 or arbitrary mixtures thereof, are preferably used for the formulation of a printing paste for the production of the at least partially transparent electrode BA. Dimethyl sulfoxide (DMSO), N,N-dimethylformamide, N,N-dimethylacetamide, ethylene glycol, glycerol, sorbitol, methanol, ethanol, isopropanol, n-propanol, acetone, methyl ethyl ketone, dimethylaminoethanol, water or mixtures of two, three or more of the aforementioned compounds can be used as solvent. The amount of solvent can vary in wide ranges in the printing paste. For example, one formulation according to the invention of a paste can contain 55 to 60 wt. % of solvent, whereas in another formulation according to the invention about 35 to 45 wt. % of a solvent mixture of two or more substances can be used. Furthermore Silquest A187, Neo Rez R986, Dynol 604 and/or mixtures of two or more of these substances can be included as surfactant additive and bonding activator. The amount of these substances is 0.1 to 5.0 wt. %, preferably 0.3 to 2.5 wt. %, referred to the total weight of the printing paste.

As binder, the formulation can contain for example Bayderm Finish 85 UD, Bayhydrol PR340/1, Bayhydrol PR135 or arbitrary mixtures thereof, preferably in amounts of about 0.5 to 10 wt. %, preferably 3 to 5 wt. %. The polyurethane dispersions used according to the invention, which after the drying of the layer form the binder for the conducting layer, are preferably aqueous polyurethane dispersions.

According to the invention, particularly preferred formulations of printing pastes for the production of the partially transparent electrode BA contain:

| Substance | Content/wt. % | Content/wt. % | Content/wt. % | Content/wt. % |
|---|---|---|---|---|
| Clevios P HS (H. C. Starck) | 33 | 48 | 40 | 42.2 |
| Silquest A187 (OSi Specialties) | 0.4 | 0.5 | 1.2 | 1.0 |
| N-methyl-pyrrolidone | 23.7 | 14.4 | 10.3 | 13.3 |
| Diethylene glycol | 26.3 | 20.7 | 30.0 | 25.4 |
| Proglyde/DMM | 12.6 | 12.4 | 14.5 | 13.6 |
| Bayderm Finish 85 UD (Lanxess) | 4.0 | 4.0 | 4.0 | 4.5 |

| Substance | Content/wt. % | Content/wt. % |
|---|---|---|
| Clevios P HS (H. C. Starck) | 33 | 40 |
| Silquest A187 (OSi Specialties) | 0.4 | 1.2 |
| N-methyl-pyrrolidone | 23.7 | 10.3 |
| Diethylene glycol | 26.3 | 30.0 |
| Proglyde/DMM | 12.6 | 14.5 |
| Bayhydrol P340/1 | 4.0 | 4.0 |

By way of departure from the formulations mentioned above for the partially transparent electrode BA, the following ready-for-use, commercially obtainable printing pastes mentioned here by way of example can also be used according to the invention as finished formulations: the Orgacon EL-P1000, EL-P3000, EL-P5000 or EL-P6000 range from Agfa, preferably the EL-P3000 and EL-P6000 range (in particular for formable uses).

These electrode materials can be applied for example by means of screen printing, knife coating, sputtering, spraying and/or brushing on corresponding carrier materials (substrates), which are then preferably dried at low temperatures of for example 80° to 120° C.

Moreover, tin oxide (NESA) pastes can also be used as corresponding electrode material.

In a preferred alternative embodiment the application of the electrically conducting coating is carried out in vacuo or pyrolytically.

Particularly preferably in the alternative embodiment the electrically conducting coating is a metallic or metal oxide, thin and largely transparent layer produced in vacuo or pyrolytically, which preferably has a sheet resistance of 5 mΩ to 3,000 Ω/square, particularly preferably a sheet resistance of 0.1 to 1,000 Ω/square, most particularly preferably 5 to 30 Ω/square, and in a further preferred embodiment has a daylight transmissibility at least greater than 60% (>60 to 100%) and in particular greater than 76% (>76 to 100%).

Furthermore electrically conducting glass can also be used as electrode.

A particularly preferred type of electrically conducting and highly transparent glass, in particular float glass, are pyrolytically produced layers that have a high surface hardness and whose electrical surface resistance can be adjusted in a very wide range from in general a few milliohms up to 3,000 Ω/square.

Such pyrolytically coated glasses can be readily shaped/formed and have a good scratch resistance, and in particular scratches do not lead to an electrical interruption of the electrically conducting surface layer, but simply to a generally slight increase of the sheet resistance.

Furthermore, pyrolytically produced conducting surface layers are due to the heat treatment diffused to such a large extent and anchored in the surface that in a subsequent material application an extremely high adhesive bonding with the glass substrate is produced, which is likewise very advantageous for the present invention. In addition such coatings have a good homogeneity, and therefore only a slight variation in the surface resistance over large surfaces. This property is likewise an advantage for the present invention.

Electrically conducting and highly transparent thin layers can be produced substantially more efficiently and cost-effectively on a glass substrate, which is preferably used according to the invention, than on polymeric substrates such as PET, PMMA or PC. The electrical sheet resistance in the case of glass coatings is on average more favourable by a factor of 10 than on a polymeric film of comparable transparency, thus for example 3 to 10 ohm/square in the case of glass layers compared to 30 to 100 0/square on PET films.

The rear electrode component BE is—as in the case of the at least partially transparent electrode—a flat electrode, which however need not be transparent or at least partially transparent. This is in general applied to the insulating layer, if present. If no insulating layer is present, then the rear electrode is applied to the layer containing at least one luminous substance that can be excited by an electrical field. In an alternative embodiment the rear electrode is applied to the substrate A.

The rear electrode is in general formed from electrically conducting materials based on inorganic or organic substances, for example from metals such as silver, wherein preferably those materials are used that are not damaged if the isostatic high-pressure forming process is used to produce the three-dimensionally formed sheet element according to the invention. Suitable electrodes include furthermore in particular polymeric electrically conducting coatings. In this case the coatings already mentioned in connection with the at least partially transparent electrode can be used.

Moreover, those polymeric electrically conducting coatings known to the person skilled in the art that are not at least partially transparent, can be employed.

The formulation of the printing paste for the rear electrode can in this connection correspond to that of the partially transparent electrode.

By way of departure from this formulation, the following formulation can however also be used according to the invention for the rear electrode.

30 to 90 wt. %, preferably 40 to 80 wt. %, particularly preferably 50 to 70 wt. %, in each case referred to the total weight of the printing paste, of the conducting polymers Clevios P, Clevios PH, Clevios P AG, Clevios P HCV4, Clevios P HS, Clevios PH, Clevios PH 500, Clevios PH 510 or arbitrary mixtures thereof, are used for the formulation of a printing paste for the production of the rear electrode. Dimethyl sulfoxide (DMSO), N,N-dimethylformamide, N,N-dimethylacetamide, ethylene glycol, glycerol, sorbitol, methanol, ethanol, isopropanol, n-propanol, acetone, methyl ethyl ketone, dimethylaminoethanol, water or mixtures of two, three or more of these solvents can be used as solvent. The amount of solvent that is used can vary in wide ranges.

Thus, one formulation of a paste according to the invention can contain 55 to 60 wt. % of solvent, whereas in another formulation according to the invention about 40 wt. % of a solvent mixture of three solvents is used. Furthermore, Silquest A187, Neo Rez 8986, Dynol 604 or mixtures of two or more of these substances can be used as surfactant additive and bonding activator, preferably in an amount of 0.7 to 1.2 wt. %. The formulation can contain for example 0.5 to 1.5 wt. % of UD-85, Bayhydrol PR340/1, Bayhydrol PR135 or arbitrary mixtures thereof as binder.

In a further embodiment according to the invention the rear electrode can be filled with graphite. This can be accomplished by adding graphite to the formulations described above. By way of departure from the formulation mentioned above for the rear electrode, the following ready-for-use, commercially obtainable printing pastes already mentioned here by way of example can also be used according to the invention: the Orgacon EL-P1000, EL-P3000, EL-P5000 or EL-P6000 range from Agfa, preferably the EL-P3000 and EL-P6000 range (for formable uses). Graphite can also be added in this case.

The printing pastes of the Orgacon EL-P4000 range, in particular Orgacon EL-P4010 and EL-4020, can also be used specifically for the rear electrode. Both can be mixed with one another in any desired ratio. Orgacon EL-P4010 and EL-4020 already contain graphite.

Graphite pastes that can also be obtained commercially, for example graphite pastes from Acheson, in particular Electrodag 965 SS or Electrodag 6017 SS, can be used as rear electrode.

A particularly preferred formulation according to the invention of a printing paste for producing the rear electrode BE contains:

| Substance | Content/wt.-% | Content/wt.-% | Content/wt.-% |
|---|---|---|---|
| Clevios P HS | 58.0 | 50.7 | 64.0 |
| Silquest A187 | 2.0 | 1.0 | 1.6 |
| NMP (e.g. BASF) | 17.0 | 12.1 | 14.8 |
| DEG | 10.0 | 23.5 | 5.9 |
| DPG/DMM | 10.0 | 8.6 | 10.2 |
| Bayderm Finish 85 UD (Lanxess) | 3.0 | 4.1 | 3.5 |

| Substance | Content/wt.-% | Content/wt.-% |
|---|---|---|
| Clevios P HS | 58.0 | 50.7 |
| Silquest A187 | 2.0 | 1.0 |
| NMP (e.g. BASF) | 17.0 | 12.1 |
| DEG | 10.0 | 23.5 |
| DPG/DMM | 10.0 | 8.6 |
| Bayhydrol P340/1 | 3.0 | 4.1 |

In the context of the present invention it is also possible to use intrinsically conducting polymers as electrode material. The sheet resistance of corresponding electrodes formed from intrinsically conducting polymers should in general be 100 to 2000 Ω/square, particularly preferably 200 to 1500 Ω/square, especially 200 to 1000 Ω/square, and specifically 300 to 600 Ω/square.

The electrically conducting materials described above can in addition be applied to a substrate formed as carrier material. Metal foils, metal layers and thermoplastic films are for example suitable as carrier material.

The rear electrode is—as in the case of the at least partially transparent cover electrode—a flat electrode, which however need not be transparent or at least partially transparent. This electrode is in general constructed of inorganically or organically based electrically conducting materials, for example metals such as silver. Suitable electrodes are furthermore in particular polymeric electrically conducting coatings. In this connection the coatings already mentioned above in connection with the at least partially transparent cover electrode can be used. In addition, those polymeric electrically conducting coatings known to the person skilled in the art and which are not at least partially transparent can also be used.

Suitable materials of the rear electrode are thus preferably selected from the group consisting of metals such as silver, carbon, ITO silk-screen printing layers, ATO silk-screen printing layers, non-ITO silk-screen printing layers, in other words intrinsically conducting polymeric systems containing normally nanoscale electrically conducting pigments, for example ATO silk-screen printing pastes with the reference identification 7162E or 7164 from DuPont, intrinsically conducting polymer systems such as the Orgacon® System from Agfa, the Baytron® poly-(3,4-ethylenedioxythiophene) system from H. C. Starck GmbH, the system from Ormecon termed organic metal (PEDT conductive polymer polyethylene-dioxythiophene), electrically conducting coating and printing ink systems from Panipol Oy and optionally with highly flexible binders, for example based on PU (polyurethanes), PMMA (polymethyl methacrylate), PVA (polyvinyl alcohol) or modified polyaniline, wherein metals such as silver or carbon can be added to, and/or incorporated as a layer in, these materials in order to improve their electrical conductivity.

Moreover, it is possible for the cover electrode BA to include particles with nanostructures.

It is also possible for the rear electrode BE to include particles with nanostructures.

In a third configuration both the cover electrode BA and the rear electrode BE contains particles with nanostructures.

In the scope of the present invention the expression "particles with nanostructures" is understood to denote nanoscale material structures that are selected from the group consisting of single-wall carbon nanotubes (SWCNTs), multi-wall carbon nanotubes (MWCNTs), nanohorns, nanodisks, nanocones (i.e. structures with conically shaped jackets), metallic nanowires and combinations of the aforementioned particles. Corresponding particles with nanostructures based on carbon can for example consist of carbon nanotubes (single-wall and multi-wall), carbon nanofibres (herringbone, platelet-type, screw-type) and the like.

The production of these single-walled carbon nanotubes is known to the person skilled in the art and reference can be made to corresponding processes in the prior art. These include for example catalytic chemical gaseous phase deposition CCVD:

These processes often produce fractions that differ as regards their diameter, length, chirality and electronic properties. They occur in the form of bundles and are often mixed with a proportion of amorphous carbon. The SWCNTs are separated out from these fractions.

The separation processes known hitherto for SWCNTs are based on electron transfer effects on metallic SWCNTs treated with diazonium salts, on dielectrophoresis, on a special chemical affinity of semiconducting carbon nanotubes for octadecylamines and on carbon nanotubes that are covered with single-strand DNA. The selectivity of these methods can be further improved by intensive centrifugation of pretreated dispersions and the use of ion exchange chromatography. In the context of the present invention preferably fraction-pure single-walled carbon nanotubes are used, i.e.

fractions of single-walled carbon nanotubes that differ in terms of a parameter selected from the group consisting of diameter, length, chirality and electronic properties, by at most 50%, particularly preferably by at most 40%, especially by at most 30%, specifically by at most 20% and most specifically by at most 10%.

With regard to metallic nanowires, reference is made to WO 2007/022226 A2, the disclosure of which regarding the nanowires disclosed therein is incorporated by way of reference in the present invention. The electrically highly conducting and largely transparent silver nanowires described in WO 2007/022226 A2 are particularly suitable for the present invention.

The production of the other particles with nanostructures is known to the person skilled in the art and is described in the corresponding documents of the prior art.

Conducting Tracks, Connections of the Electrodes

In the case of large area luminous elements with a luminous capacitor structure, the surface conductivity plays a significant role as regards a uniform luminous density. In the case of large area luminous elements so-called busbars are frequently used as conducting tracks, i.e. component BF, especially with semiconducting LEPs (light-emitting polymers), PLED and/or OLED systems, in which relatively large currents flow. In this case very highly electrically conducting tracks are formed in the manner of a cross. In this way a large surface area for example is subdivided into four small areas. The voltage drop in the middle region of a luminous surface is thereby significantly reduced and the uniformity of the luminous density and the decrease in brightness in the centre of a luminous field is reduced.

In the case of a zinc sulfide particular EL field employed in one embodiment according to the invention, in general alternating voltages greater than 100 volts and up to more than 200 volts are applied, and very low currents flow if a good dielectric material or good insulation are employed. In the ZnS thick-film AC-EL element according to the invention the problem of current loading is therefore substantially less than in the case of semiconducting LEP or OLED systems, so that the use of busbars is not absolutely essential, but instead large area luminous elements can already be installed without using busbars.

Preferably according to the invention it is sufficient if the silver bus in the case of areas smaller than DIN A3 is printed only on the edge of the electrode layer BA or BE; with areas larger than DIN A3 it is preferred according to the invention if the silver bus forms at least an additional conducting track.

The electrical connections can be produced for example by using electrically conducting and stovable pastes containing tin, zinc, silver, palladium, aluminium and further suitable conducting metals, or combinations and mixtures or alloys thereof.

In this connection the electrically conducting contacting strips are generally applied by means of screen printing, brush application, ink-jet, knife coating, roller application, spraying, or by means of dispenser application or comparable application methods known to the person skilled in the art, to the electrically conducting and at least partially transparent thin coatings, and are then generally heat treated in an oven so that strips normally applied laterally along a substrate edge can be effectively contacted in an electrically conducting manner by means of soldering, clamping or plug-in connection.

So long as only very small electrical outputs have to be initiated on electrically conducting coatings, spring contacts or carbon-filled rubber elements or so-called zebra rubber strips are sufficient.

Pastes based on silver, palladium, copper or gold-filled polymer adhesives are preferably used as conducting adhesive pastes. Self-adhesive, electrically conducting strips of for example tin-plated copper foil with an electrically conducting adhesive in the z-direction can likewise be applied by contact pressing.

The adhesive layer is in this case generally uniformly pressed in by exerting a surface pressure of a few N/cm$^2$, and depending on the implementation, values of 0.013 ohm/cm$^2$ (for example conductive copper foil tape VE 1691 from the company D & M International, A-8451 Heimschuh) or 0.005 ohm (for example type 1183 from 3M Electrical Products Division, Austin, Tex. USA; according to MIL-STD-200 Method 307 maintained at 5 psi/3.4 N/cm$^2$ measured over 1 sq.in. surface area) or 0.001 ohm (for example type 1345 from the 3M company) or 0.003 ohm (for example type 3202 from the company Holland Shielding Systems BV) are thereby achieved.

The contacting can however be carried out by all conventional methods known to the person skilled in the art, for example crimping, plugging in, clamping, riveting or bolting/screwing.

Dielectric Layer

The EL element according to the invention preferably comprises at least one dielectric layer, component BD, which is provided between the rear electrode, component BE, and the EL layer, component BC.

Suitable dielectric layers are known to the person skilled in the art. Suitable layers often include highly dielectrically acting powders, such as for example barium titanate, which are preferably dispersed in fluorene-containing plastics or in cyano-based resins. Examples of particularly suitable particles are barium titanate particles in the range of preferably 1.0 to 2.0 p.m. With a high degree of filling these can produce a relative dielectric constant of up to 100.

The dielectric layer has a thickness of generally 1 to 50 µm, preferably 2 to 40 µm, particularly preferably 5 to 25 µm, especially 8 to 15 µm.

The EL element according to the invention can in one embodiment also additionally contain a further dielectric layer, which layers are arranged above one another and together improve the insulation effect, or which is interrupted by a floating electrode layer. The use of a second dielectric layer can depend on the quality and pinhole freedom of the first dielectric layer.

As fillers, inorganic insulating materials are used, which are known to the person skilled in the art from the literature and include for example: $BaTiO_3$, $SrTiO_3$, $KNbO_3$, $PbTiO_3$, $LaTaO_3$, $LiNbO_3$, $GeTe$, $Mg_2TiO_4$, $Bi_2(TiO_3)_3$, $NiTiO_3$, $CaTiO_3$, $ZnTiO_3$, $Zn_2TiO_4$, $BaSnO_3$, $Bi(SnO_3)_3$, $CaSnO_3$, $PbSnO_3$, $MgSnO_3$, $SrSnO_3$, $ZnSnO_3$, $BaZrO_3$, $CaZrO_3$, $PbZrO_3$, $MgZrO_3$, $SrZrO_3$, $ZnZrO_3$ and lead zirconate-titanate mixed crystals or mixtures of two or more of these fillers. Preferred fillers according to the invention are $BaTiO_3$ or $PbZrO_3$ or mixtures thereof, preferably in filling amounts of 5 to 80 wt. %, preferably 10 to 75 wt. %, particularly preferably 40 to 70 wt. %, in each case referred to the total weight of the paste, in the paste used to produce the insulating layer. Examples of particularly suitable particles are barium titanate particles in the range from preferably 1.0 to 2.0 µm. These can with a high degree of filling produce a relative dielectric constant of up to 100.

One-component or preferably two-component polyurethane systems can be used as binder for this layer, preferably the systems available from Bayer MaterialScience AG, particularly preferably Desmodur and Desmophen or the lacquer raw materials of the Lupranate, Lupranol, Pluracol or Lupraphen range from BASF AG; from Degussa AG (Evonik), preferably vestanate, particularly preferably vestanate T and B; or from the Dow Chemical Company, preferably vorastar. Furthermore highly flexible binders can also be used, for example those based on PMMA, PVA, in particular mowiol and poval from Kuraray Specialties Europe GmbH or polyviol from Wacker AG, or PVB, in particular mowital from Kuraray Specialties Europe GmbH (B 20 H, B 30 T, B 30 H, B 30 HH, B 45 H, B 60 T, B 60 H, B 60 HH, B 75 H), or pioloform, in particular pioloform BR18, BM18 or BT18, from Wacker AG. In particular fluorene-containing plastics or cyano-based resins can also be used as binder matrix.

As solvents there may for example be used ethyl acetate, butyl acetate, 1-methoxypropyl acetate-2, toluene, xylene, solvesso 100, shellsol A or mixtures of two or more of these solvents. If for example PVB is used as binder, the paste can also contain methanol, ethanol, propanol, isopropanol, diacetone alcohol, benzyl alcohol, 1-methoxypropanol-2, butyl glycol, methoxybutanol, dowanol, methoxypropyl acetate, methyl acetate, ethyl acetate, butyl acetate, butoxyl, glycolic acid n-butyl ester, acetone, methyl ethyl ketone, methyl isobutyl ketone, cyclohexanone, toluene, xylene, hexane, cyclohexane, heptane, as well as mixtures of two or more of the aforementioned solvents, in amounts of 1 to 30 wt. % referred to the total weight of the paste, preferably 2 to 20 wt. %, particularly preferably 3 to 10 wt. % Furthermore additives such as flow improvers and rheology additives can be added in order to improve the properties. Examples of flow improvers are Additol XL480 in butoxyl in a mixing ratio of 40:60 to 60:40. The paste can contain as further additives 0.01 to 10 wt. %, preferably 0.05 to 5 wt. %, particularly preferably 0.1 to 2 wt. %, in each case referred to the total weight of paste. As rheology additives, which reduce the settling behaviour of pigments and fillers in the paste, there can for example be used BYK 410, BYK 411, BYK 430, BYK 431 or arbitrary mixtures thereof.

Particularly preferred formulations according to the invention of a printing paste for the production of the insulating layer as component BB and/or BD contain:

| Substance | Content/ wt. % | Content/ wt. % | Content/ wt. % | Content/ wt. % |
|---|---|---|---|---|
| BaTiO$_3$ | 50 | 50 | 50 | 55 |
| Desmophen 1800 (BMS) | 25 | 25 | 25 | 22.5 |
| Desmodur L67 MPA/X (BMS) | 14 | 14 | 14 | 11.4 |
| Ethoxypropyl acetate | 8.7 | 0 | 4 | 0 |
| Methoxypropyl acetate | 0 | 8.7 | 4.7 | 8.6 |
| Additol XL480 (50 wt. % in butoxyl) | 2.3 | 2.3 | 2.3 | 2.5 |

| Substance | Content/ wt. % | Content/ wt. % | Content/ wt. % | Content/ wt. % |
|---|---|---|---|---|
| BaTiO$_3$ | 55 | 56.6 | 59.9 | 59.9 |
| Desmophen 1800 (BMS) | 22.5 | 20.3 | 19.9 | 19.9 |
| Desmodur L67 MPA/X (BMS) | 11.4 | 12.5 | 11.2 | 11.2 |
| Ethoxypropyl acetate | 8.6 | 7.6 | 5.7 | 0 |
| Methoxypropyl acetate | 0 | 0 | 0 | 5.7 |
| Additol XL480 in butoxyl 50% | 2.5 | 3.0 | 3.3 | 3.3 |

| Substance | Content/ wt. % | Substance | Content/ wt. % |
|---|---|---|---|
| BaTiO$_3$ | 55 | BaTiO$_3$ | 60.2 |
| Desmophen 1800 (BMS) | 22.5 | Desmophen 670 (BMS) | 14.3 |
| Desmodur L67 MPA/X (BMS) | 12 | Desmodur N75MPA (BMS) | 12.3 |
| Ethoxypropyl acetate | 8 | Ethoxypropyl acetate | 10.3 |
| Additol XL480 (50 wt. % in butoxyl) | 2.5 | Additol XL480 (50 wt. % in butoxyl) | 2.9 |

Cover Layer

In addition to the components A and B the EL element according to the invention contains a protective layer, component CA, in order to prevent a destruction of the electroluminescent element or of the possibly present graphical representations. Suitable materials for the protective layer are known to the person skilled in the art. Suitable protective layers CA are for example high temperature resistant protective lacquers such as protective lacquers containing polycarbonates and binders. An example of such a protective lacquer is Noriphan® HIR from Pröll, Weißenburg.

Alternatively the protective layer can also be formulated on the basis of flexible polymers such as polyurethanes, PMMA, PVA or PVB. Polyurethanes from Bayer MaterialScience AG can be used for this purpose. This formulation can also be provided with fillers. All fillers known to the person skilled in the art are suitable for this purpose, for example based on inorganic metal oxides such as TiO$_2$, ZnO, lithopones, etc., with a degree of filling of 10 to 80 wt. % of the printing paste, preferably a degree of filling of 20 to 70%, particularly preferably of 40 to 60%. Furthermore the formulations can contain flow improvers as well as rheology additives. As solvents there can be used for example ethoxypropyl acetate, ethyl acetate, butyl acetate, methoxypropyl acetate, acetone, methyl ethyl ketone, methyl isobutyl ketone, cyclohexanone, toluene, xylene, solvent naphtha 100 or mixtures of two or more of these solvents.

According to the invention particularly preferred formulations of the protective lacquer CA contain for example:

| Substance | Content/ wt. % | Content/ wt. % | Content/ wt. % | Content/ wt. % |
|---|---|---|---|---|
| Desmophen 670 (BMS) | 18.9 | 22.0 | 17.3 | 22.0 |
| Additol XL480 (50 wt. % in butoxyl) | 1.2 | 0.8 | 1.0 | 0.8 |
| Desmodur N75 MPA (BMS) | 20.0 | 20.0 | 17.4 | 20.0 |
| Ethoxypropyl acetate | 4.5 | 8.5 | 4.3 | 0 |
| Methoxypropyl acetate | 0 | 0 | 0 | 8.5 |
| TiO$_2$ | 55.4 | 48.7 | 60.0 | 48.7 |

| Substance | Content/ wt. % |
|---|---|
| Desmophen 1800 (BMS) | 22.9 |
| Additol XL480 (50 wt. % in butoxyl) | 1.1 |
| Desmodur L67 MPA/X (BMS) | 12.9 |
| Ethoxypropyl acetate | 10.6 |
| TiO$_2$ | 52.5 |

Substrates

The EL element according to the invention can comprise on one or both sides of the respective electrodes, substrates such as for example glasses, plastics films or the like.

In the EL element according to the invention it is preferred if at least the substrate that is in contact with the transparent electrode is designed to be graphically glazingly translucent and opaquely covering on the inside. An opaque covering design is understood to mean a large area electroluminescence region that is opaquely covered by a high-resolution graphical design and/or is formed glazingly, for example in the sense of red-green-blue, translucently for signalling purposes.

The electroluminescent arrangement according to the invention can be applied via the rear electrode BE to a rear substrate, for example an aluminium substrate. The electroluminescent arrangement can in this connection be joined to the substrate via an adhesive layer that is applied to the rear electrode.

In a further embodiment of the present invention, in the EL arrangement according to the invention a layer of a protective lacquer can be provided between the substrate and the rear electrode. If the layer of a protective lacquer is provided in the electroluminescent arrangement according to the invention, then the electroluminescent arrangement can be joined to the corresponding substrate via an adhesive layer, which in this case is applied to the layer of the protective lacquer.

A cold-setting adhesive system as well as a hot-setting adhesive system can be used as adhesive system.

The adhesive system employed in the electroluminescent arrangement according to the invention can be formulated as a one-component system as well as a two-component system.

The adhesive system can in one modification be based on a system comprising silicone, ethylene vinyl acetate, PVC or thermoplastic urethane elastomers. Of these, adhesive systems based on thermoplastic urethane elastomers are particularly preferred.

In a special embodiment an adhesive system based on thermoplastic urethane elastomers (TPU) is therefore used for the bonding of the electroluminescent arrangement according to the invention.

The adhesive system can be formulated as a film, i.e. the adhesive system can be used in the form of a film. This embodiment simplifies the production of corresponding EL systems on account of the simplified handling of the films.

As examples of materials for the adhesive layer formed as films, there may be mentioned films known by the trade marks Dureflex®, Platilon® and/or Walopur®, which are based on thermoplastic urethane elastomers.

If corresponding film-based adhesive systems are used, then the films can be used together with a carrier film. In this case the thickness of the adhesive layer in the form of a film is 0.01 to 2 mm, particularly preferably 0.02 to 0.5 mm, especially 0.15 to 0.40 mm A further substrate (cover substrate) can also be provided on the cover electrode BA in the electroluminescent arrangement according to the invention.

The cover substrate is likewise fixed to the electroluminescent arrangement according to the invention using the adhesive systems mentioned above. Here too systems based on thermoplastic polyurethane elastomers are preferred.

Since the electroluminescence generated by the arrangement according to the invention is emitted through the cover substrate, it is preferred if the cover substrate is formed so as to be transparent.

In a modification of the present invention the cover substrate can be matt on the upper side, i.e. on the side facing away from the electroluminescent arrangement.

In addition it is preferred if the substrate that is in contact with the transparent electrode BA is a film that is cold-stretchably workable below the glass transition temperature Tg. In this way the possibility is provided of working the resulting EL element three-dimensionally, preferably free of stress-whitening.

Furthermore it is preferred if the substrate that is in contact with the rear electrode BE is a film that is likewise cold-stretchably workable below Tg. In this way the possibility is provided of working the resulting EL element three-dimensionally, preferably free of stress-whitening.

The EL element is thus three-dimensionally workable, wherein the radii of curvature may be less than 2 mm, preferably less than 1 mm. The working angle can in this connection be greater than 60°, preferably greater than 75°, particularly preferably greater than 90° and especially greater than 105°.

Moreover it is preferred if the EL element is three-dimensionally workable and in particular is cold-stretchably workable below Tg and in this way receives a precise, worked three-dimensional shape.

The three-dimensionally worked element can be moulded on at least one side with a thermoplastic material in an injection mould.

Production of EL Elements According to the Invention

Normally the pastes mentioned hereinbefore (screen printing pastes) are applied to transparent plastics films or glasses, which in turn comprise a largely transparent electrically conducting coating and thereby form the electrode for the visual display side. The dielectric material, if present, and the rear side electrode are then produced by printing techniques and/or lamination techniques.

A reverse production process is however also possible, in which first of all the rear side electrode is produced or the rear side electrode is used in the form of a metallised film and the dielectric material is applied to this electrode. The EL layer and following this the transparent and electrically conducting upper electrode are then applied. The resultant system can then optionally be laminated with a transparent cover film and thereby protected against water vapour and also against mechanical damage.

In one embodiment of the invention the conducting tracks (silver bus) can be applied as first layer to the substrate A. According to the invention they are however preferably applied to the electrodes BA and BE either in two work stages, in each case individually to the electrodes, or in one work step to the electrodes jointly.

The EL layer is normally applied by a printing technique by means of screen printing or dispenser application or ink-jet application, or also in a knife coating procedure or a roller coating method or a curtain casting method or a transfer method, but preferably by means of screen printing. The EL layer is preferably applied to the surface of the electrode or to the insulating layer optionally applied to the rear electrode. Following this, in general at least two alternating voltage supply leads are attached at two sites arranged spaced from one another on at least one of the flat electrodes.

Further Configurations of the EL Arrangement According to the Invention

By using at least two EL layers it is moreover possible to produce a luminous field that differs locally and in wavelength by choosing at least two adjacently arranged electroluminescent layers containing different electroluminescent phosphor pigments.

The electroluminescent arrangement according to the invention is operated by an electroluminescence voltage supply with an alternating voltage frequency in the range from 200 Hz to above 1,000 Hz. In this connection a coding can be created in the range of a few Hz, so that in this way the coding can be verified by machine, for example by means of an optoelectronic sensor or by means of a camera. Also for example the validity of an automobile distinguishing sign or the validity of a license and other security-related properties can thereby be checked.

The present invention also provides for the use of an electroluminescent arrangement as described above as a decorative element and/or luminous element in interiors or for external use, preferably on external facades of buildings, in or on facilities and installations, in or on land, airborne or waterborne vehicles, in or on electrical or electronic devices, or in the advertising sector.

In this connection the electroluminescent arrangement can be designed as an optically signalling element, in which the voltage levels, the voltage differences, the frequencies and/or the frequency differences can be controlled and modulated by the loudness level and the frequency response of a music source and/or by electronic, sensory and/or computer-controlled regulation.

Also, the electroluminescent arrangement according to the invention can be designed as a combined safety glass element or as an insulating glass element.

The electroluminescent arrangement can thus be used as a visual indicator for measurable and/or sensorially detectable quantities, in particular noise, smoke, vibration, speed, atmospheric humidity and/or temperature.

The electroluminescent arrangement according to the invention is suitable in particular as a constituent of self-luminescent automobile distinguishing signs. For this purpose it is however necessary that the electroluminescent arrangement be subjected to a working step in order to provide the automobile distinguishing sign with the corresponding automobile distinguishing sign number. This is generally carried out by a working step executed from the rear side of the number plate so that the corresponding letters and numbers are pressed out forwardly from the number plate. This region can then be made black-opaque.

With this embossing the problem may however arise that cracks occur in the electrode coatings, as a result of which the conductivity of the electrode is restricted or is even interrupted in parts.

Furthermore, if there is an overloading due to the power supply this can lead to a fracture of the cover electrode and/or rear electrode of the electroluminescent arrangement according to the invention.

The present invention solves this problem comprehensively, in that a metal grid is preferably incorporated in the respective electrodes. In a special embodiment of the present invention it is therefore envisaged that at least one electrode, either the rear electrode BE or the cover electrode BA, includes a metal grating or grid. The metal grating or grid—in contrast to the (conventional) electrode per se—is more easily three-dimensionally workable and, on account of the expandability of the metal grating or grid, fractures significantly less often and in general only under a significantly greater working, which is generally not necessary with electroluminescent arrangements of the type under discussion, and also when used as a component part of a vehicle distinguishing sign.

The metal grid can in this connection be a metal grid inlay with crossing or intersecting strands.

The metal grid can moreover in a further configuration consist of crossing warp strands and weft strands.

The metal grid can in general be produced using different metals. Thus, it is possible for the metal grid to consist substantially of one metal, which is selected from the group consisting of silver, copper, gold, platinum, brass, iron and nickel. It is particularly preferred if the metal grid consists substantially of silver. Depending on the electrical conductivity, the thickness of the conductor can be between 5 µm and 2 mm, preferably between 10 and 200 µm. The grid can be in the form of a chessboard pattern, in the form of hare wires, or of any other arbitrary shape.

In the case where the electrical conductivity of the electrode material is interrupted—independently of the type and reason for the interruption—the electrical conductivity of the electrodes can in this case continue to be maintained via the additional metal grid. Thus, even in the event of damage the function module can be operated with a virtually unaffected performance. The fatigue properties are thereby improved.

In a further modification of the present invention the use of corresponding metal grids in electroluminescent arrangements of the type under discussion is claimed, wherein the intended use is aimed at bridging breaks in electrical conductivity in the electrodes due to working (deformation) of the electroluminescent arrangement.

The contacting of the electrodes of the electroluminescent arrangement according to the invention can take place in different ways.

Thus, in a first embodiment of the present invention it is possible for the rear electrode and/or the cover electrode to be contacted by means of a power supply lead. The respective power supply lead is preferably arranged outside the electroluminescence field and is preferably configured so that it can effect a uniform EL emission over the whole EL surface. As regards this power supply lead designed as a busbar, it is convenient to feed the alternating current flowing to the cover electrode and rear electrode over as large an area as possible, in order to keep the local current densities as low as possible. Otherwise there is the danger, on account of the small thickness of the rear electrode and cover electrode, of at least localised damage due to burning or vaporisation on account of too high a current density.

The corresponding busbars can be formed by highly conducting, printing pastes. These pastes can for example be opaque silver pastes, copper pastes or carbon pastes. Suitable printing pastes are basically not subject to any restriction as regards the sheet resistance. Normally however they have a sheet resistance in the range from below 10 mΩ/square to a few 100 mΩ/square.

Especially with large surface areas and interspacings and relatively high-resistive transparent electrode layers, it is suitable to use busbars for a uniform EL emission.

In one configuration the busbar for the rear electrode BE is provided between the rear electrode BE and a further protective lacquer described hereinbelow.

In one configuration the busbar for the cover electrode BA is provided between the cover electrode BA and the cover substrate.

The busbars can for example be joined by means of contacting strips to a corresponding electroluminescence converter (inverter).

Corresponding electrically contacting strips can in general be applied by means of screen printing, brush application, ink-jet, knife coating, roller, by spraying or by means of dispenser application or comparable application methods known to the person skilled in the art, to the electrically conducting and at least partially transparent thin coatings and then in general heat treated in an oven so that strips normally applied laterally along a substrate edge can be contacted in a good electrically conducting manner by means of soldering, clamping, crimping, riveting, bonding or a plug-in connection.

In a special embodiment of the present invention the contacting of the rear electrode and/or of the cover electrode, possibly directly via a busbar, can also take place on the rear side down to the rear substrate through a contacting element. In this case at least two recesses for the electrical contacts are provided in the electroluminescent arrangement vertically in the direction of the layer structure. Contacting elements, for example in the form of a screw connection, a rivet connection or a sawtooth-shaped connection, are inserted in a positive locking manner into these recesses. The contacting elements are designed so that there is an electrical contact through these contacting elements with the corresponding cover electrode and rear electrode. This contact with the respective electrodes can also be effected via an already described intermediately connected busbar, with the advantages already described above. This is particularly preferred since the electrical power feed then takes place not only at the contacting element/electrode contact site, but over a large area at the busbar/electrode contact site.

The recesses that in this embodiment are provided in the electroluminescent arrangement according to the invention are preferably formed in the edge region of the electroluminescent arrangement.

A mechanical fixing of the electroluminescent arrangement is also possible via the corresponding contact elements.

This type of contacting according to the invention and which is particularly preferred is described in more detail in the figures relating to the present invention.

Independently of the precise nature of the contacting of the rear and/or cover electrode, these connections are joined to an electroluminescence inverter (converter).

If the electroluminescent arrangement according to the invention is used as a self-luminescent distinguishing sign on a vehicle, this power supply can be provided by the electrical circuit of a vehicle.

In this connection it is furthermore possible for the electroluminescent arrangement to be supplied automatically with current when starting the vehicle, so that the driver of a vehicle is always assured of a sufficient illumination, for example of the automobile distinguishing signs, independently of the respective lighting conditions and without switching on the electroluminescence function.

If the electroluminescent arrangement is used as a distinguishing sign for a vehicle, it is preferred if the cover substrate of the EL arrangement is formed as a plastics film. In this case it is also additionally preferred if the cover substrate is a film based on polycarbonate or a polycarbonate blend. Polycarbonate (PC) is a thermally and mechanically highly stressable plastics material with outstanding transparency. It is particularly suitable for use as a cover substrate for the electroluminescent arrangement according to the invention if this is used as a component part of a distinguishing sign for vehicles, since the material satisfies extremely stringent demands as regards impact strength, scratch resistance and heat stability.

Furthermore, the cover substrate provided according to the invention in the form of a polycarbonate film ensures that the surface of the cover substrate has a scratch-resistant surface roughness, so that the cover substrate does not produce any specular reflection effects. In addition, the service life of the system according to the invention is improved by virtue of the fact that yellowing effects and embrittlement effects are largely avoided.

In one embodiment of the present invention the polycarbonate film has on at least one side a matt surface and on the remaining side a graphical configuration.

Suitable polycarbonate films are in particular polycarbonate films made from the materials Makrofol®, Bayfol®, Marnot® or ProTek®. The thickness of corresponding polycarbonate films is generally in a range from 50 to 350 µm, particularly preferably 75 to 300 µm, especially 100 to 250 µm.

The further structure of the electroluminescent arrangement according to the invention, in particular when used as vehicle distinguishing signs, is not subject to any special restriction. For example, it is possible to apply a layer of a white lacquer on the cover substrate. A reflecting layer for example can then be provided on the layer of white lacquer. If a white lacquer is used in the electroluminescent arrangement according to the invention, then the reflecting layer can be joined to the layer of white lacquer via an adhesive. As regards this adhesive system, reference is made to the above implementations.

In order that the electroluminescent arrangement according to the invention can be used for example as a distinguishing sign for a vehicle, it is preferred if the reflecting layer, if this is used in the context of the electroluminescent arrangement according to the invention, is designed to be substantially transparent.

For the present invention it has moreover proved advantageous if the reflection is increased by using hollow glass spheres. In a further special embodiment of the present invention the electroluminescent arrangement therefore comprises hollow glass spheres.

In order to improve the reflecting properties the hollow glass spheres can be added to the cover substrate.

In addition it is also possible to add hollow glass spheres to the reflecting layer, if this is used in the context of the electroluminescent arrangement according to the invention.

Furthermore it is possible to add hollow glass spheres both to the cover substrate and to the reflecting layer.

If in one of these modifications hollow glass spheres are used in the electroluminescent arrangement according to the invention, then these preferably have a mean diameter of 5 to 200 µm, particularly preferably 10 to 100 µm, especially 15 to 50 µm. The specific weight of corresponding hollow glass spheres is preferably 0.05 to 10 $g/cm^3$, particularly preferably 0.1 to 5 $g/cm^3$, especially 0.15 to 1 $g/cm^3$. Corresponding hollow glass spheres are based for example on water-insoluble, chemically stable soda lime borosilicate glass and are commercially obtainable under the names Scotchlite® Glass Bubbles S60 or S60HS.

These corresponding hollow glass spheres can be applied for example in a binder matrix of the cover substrate or of the reflecting layer.

The electroluminescent arrangement described above is preferably used in automobile distinguishing signs.

It is therefore preferred to use as rear substrate a metal substrate, preferably an aluminium substrate. In particular this can be aluminium sheet material.

In order that the distinguishing sign for, vehicles can be embossed, the electroluminescent arrangement according to the invention is in its totality preferably designed so that it is cold-workable and therefore free of stress-whitening. The distinguishing sign can in particular be worked three-dimensionally, in which connection the radii of curvature may be less than 2 mm, preferably less than 1 mm. The working angle can in this connection be greater than 60°, preferably greater than 75°, particularly preferably greater than 90°, and in particular greater than 105°.

In particular the electroluminescent arrangement according to the invention is used as a front diaphragm blank for a number plate of a vehicle. The provision of the electroluminescent arrangement as a front diaphragm blank is in this connection preferably effected from an arc-shaped format by means of punching tools, cutting tools and/or a laser jet system.

On the front diaphragm blank an embossing is applied from behind to the distinguishing sign of the vehicle. The elevations formed by the embossing on the front side are then generally coloured opaque as black regions.

Corresponding blanks generally have a layer thickness of 50 to 350 μm, particularly preferably 75 to 300 μm, especially 100 to 250 μm.

The electroluminescent arrangement according to the invention, which is used in distinguishing signs of vehicle number plates, is in general configured so that in addition to the white light generated by electroluminescence, it additionally emits colours of specific wavelengths. In this way an additional graphical configuration can optionally be achieved. The additional wavelength-specific emission can for example produce a symbol in the manner of a watermark on the arrangement, in which connection the watermark can also be arranged concealed in a time-resolved manner in order to make the distinguishing sign secure against counterfeiting.

The electroluminescent arrangements according to the invention can be produced on conventional flat-bed and/or cylinder screen printing machines using the multiple letter press sheet format, and during the production can also be provided for example with further security features by printing techniques.

The present invention accordingly also provides distinguishing signs, in particular for vehicles, comprising the electroluminescent arrangement described above, wherein the distinguishing sign is fixed in a frame and the at least two electrical connections of the EL element are joined to an EL inverter (converter), which in general is in turn connected to the electrical circuit of the vehicle, and is preferably automatically supplied with current when starting up the vehicle, and in this way causes the EL film to luminesce.

Some examples of implementation of the invention are described in more detail hereinafter with the aid of the drawings. These embodiments represent exemplary forms of the present invention, although the present invention is not restricted to these embodiments.

Reference Numerals
1: self-luminescent distinguishing sign
2: perforation (recess)
3: perforation (recess)
4: rear substrate of aluminium
5: adhesive layer based on TPU
6: electroluminescent arrangement
7: cover substrate
8: direction of electroluminescence
9: adhesive layer based on TPU
10: polymeric binder matrix
11: hollow glass spheres
12: front-side elevations
13: bright surface, front side
14: frame
15: reflecting layer in the form of a film
16: electrical contacting elements
17: cover electrode
18: busbar of the cover electrode
19: rear electrode
20: busbar of the rear electrode
21: electroluminescence inverter
22: compression sleeve
23: dielectric layer/insulating layer
24: electroluminescent layer
25: contact surface
26: recess
27: contact surface
28: recess
29: sealing O-ring/flat sealing ring
30: security embossing
31: fixing device
32: rubber seal
33: rubber seal
34: contact surface
35: contact surface
36: conducting wire
37: insulation
38: unilluminated edge
39: EL field In FIG. 1 a self-luminescent automobile distinguishing sign 1 with the alphanumeric identification "BMS-123" is shown by way of example in plan view. The electrical contacting is effected via two perforations (holes) identified by the reference numerals 2 and 3, whereby by means of these holes 2 and 3 a mechanical fastening of the automobile distinguishing sign to the vehicle can also be effected.

Figure 2:
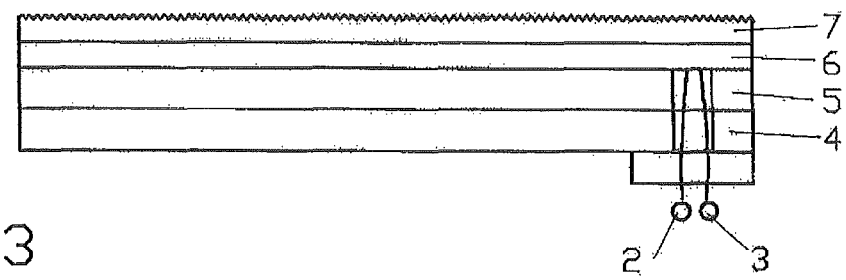
FIG. 2 illustrates the three-dimensional layer structure of an electroluminescent arrangement according to the invention.

FIG. 2 shows the three-dimensional layer structure of an electroluminescent arrangement according to the invention. The base of the electroluminescent arrangement illustrated in this figure is a metallic, workable rear substrate 4 made of aluminium. An adhesive layer 5 based on TPU is arranged on this rear substrate 4. An electroluminescent arrangement 6 according to the invention is provided as the next layer on this adhesive layer 5. The laminating of the electroluminescent arrangement 6 according to the invention on the rear substrate 4 via the adhesive layer 5 is carried out by matching corresponding pressure and temperature regions. A cover substrate 7 is applied to the electroluminescent arrangement 6 according to the invention. The cover substrate consists of a polycarbonate film of the materials Makrofol® or Bayfol®. The three-dimensional layer structure is illustrated graphically. The perforations 2 and 3 for the electrical contacting are shown only diagrammatically.

Figure 3:
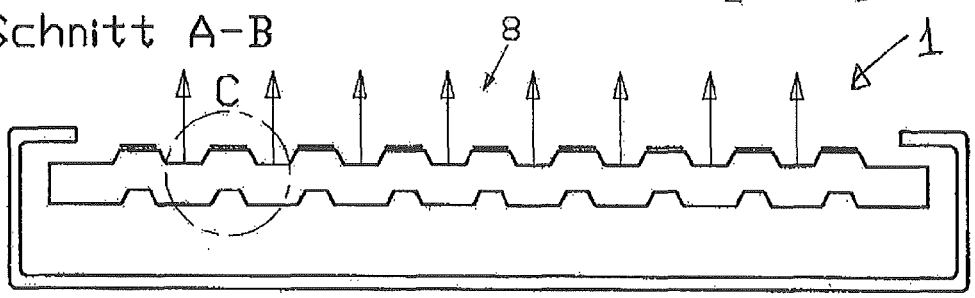
FIG. 3 illustrates the section A/B (according to FIG. 1) through the self-luminescent automobile distinguishing sign.

In FIG. 3 the section A/B (according to FIG. 1) through the self-luminescent automobile distinguishing sign 1 is shown. The electroluminescence direction 8 as well as the section C is illustrated, which is described in more detail in the following FIG. 4.

Figure 4:
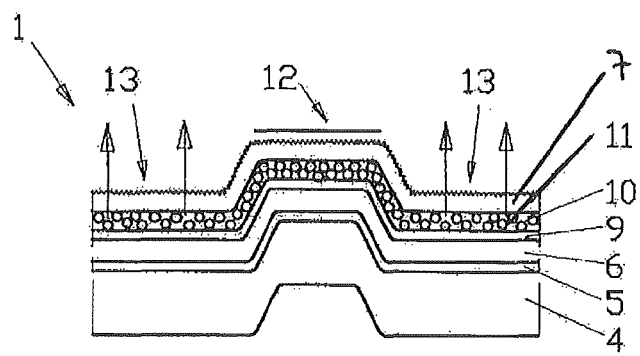
FIG. 4 illustrates the section C shown in FIG. 3 in more detail.

In FIG. 4 the section C shown in FIG. 3 is illustrated in more detail. The base of the electroluminescent arrangement illustrated in this figure is again a metallic, workable rear substrate 4 made of aluminium, on which is provided an adhesive layer 5 of TPU. An electroluminescent arrangement 6 according to the invention is provided as the next layer on this adhesive layer 5. By means of a further adhesive layer 9 of TPU the electroluminescent arrangement 6 is provided with a polymeric binder matrix 10 containing hollow glass spheres 11. TPU is likewise used as binder in this layer. A cover substrate 7 of a polycarbonate film with a layer thickness of 100 to 250 μM is then laminated on to the structure. The self-luminescent automobile distinguishing sign 1 is worked three-dimensionally, whereby elevations 12 are formed on the front side, which are kept opaque in black. The region of the self-luminescent automobile distinguishing sign 1 that does not include any elevations 12 has a bright surface 13. The three-dimensional layer structure is illustrated graphically.

Figure 5:
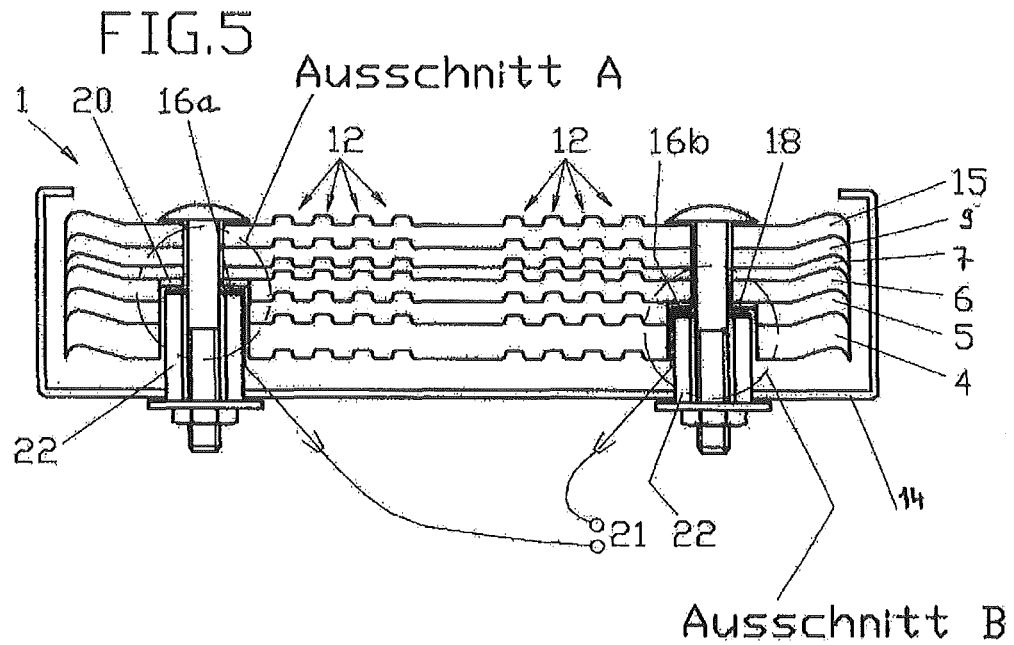
FIG. 5 illustrates a contacting variant for the automobile distinguishing sign according to the invention

A contacting variant for the automobile distinguishing sign according to the invention is illustrated in FIG. 5. The automobile distinguishing sign is in this case provided with a frame 14. The structure of the electroluminescent arrangement according to the invention is the same as the structure already described in the previous figures, consisting of an aluminium substrate 4 to which is applied a first adhesive layer 5 of TPU. An electroluminescent arrangement 6 is applied to the adhesive layer 5 of TPU, the cover substrate 7 consisting of a polycarbonate film being applied in turn to the arrangement 6. A further adhesive layer 9 of TPU and a reflecting layer in the form of a film 15 are applied to the cover substrate. The self-luminescent automobile distinguishing sign 1 is worked three-dimensionally, whereby elevations 12 are formed on the front side, which are kept opaque in black. The electrical contacting is effected via electrical contacting elements 16, provided in the edge region of the automobile distinguishing sign. The electrical contacting element 16a is connected in an electrically conducting manner to the cover electrode 17. The electrical contact between the contacting element 16a and the cover electrode 17 is effected via a busbar 20, which is formed by carbon and a silver paste. The electrical contacting element 16b is connected in an electrically conducting manner to the rear electrode 19. The electrical contact between the contacting element 16b and the rear electrode 19 is effected via a busbar 18, which is formed by carbon and a silver paste. The contact elements are connected in an electrically conducting manner to an electroluminescence inverter 21. The respective contact elements are fixed in position by compression sleeves 22, which are provided on the rear side of the automobile distinguishing sign 1. FIG. 5 shows two sections A and B, which are described in more detail in the following figures. In FIG. 5 the cover electrode 17 and the rear electrode 19 are not shown, but are a component part of the illustrated EL element 6.

Figure 6:
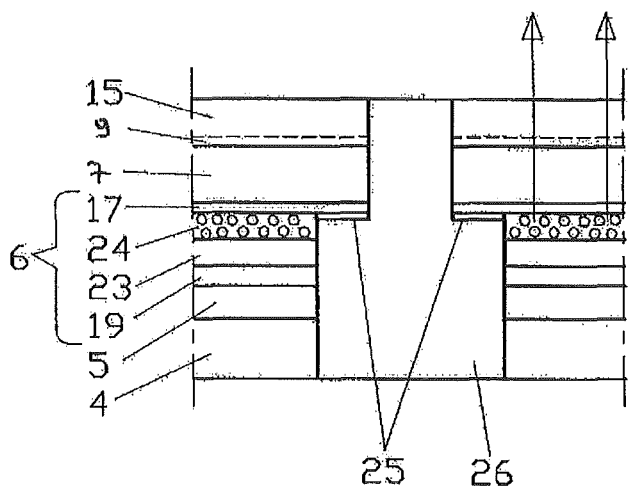
FIG. 6 illustrates the section A in FIG. 5. Section A shows the contacting of the cover electrode.

The section A illustrated in FIG. 5 is described in FIG. 6. The section A shows the contacting of the cover electrode 17. The structure of the electroluminescent arrangement according to the invention is the same as that already described in the previous figures, consisting of an aluminium substrate 4, to which is applied a first adhesive layer 5 of TPU. An electroluminescent arrangement 6 according to the invention is applied to the adhesive layer 5 of TPU, wherein the arrangement 6 consists of the rear electrode 19, a dielectric layer 23, an electroluminescent layer 24 and a cover electrode 17. The cover substrate 7 consisting of a polycarbonate film is in turn applied to the cover electrode 17. A further adhesive layer 9 based on TPU and a reflecting layer in the form of a film 15 are applied to the cover substrate 7. The contacting of the cover electrode is effected via the contact surface identified by the reference numeral 25. The contacting element 16a is not shown in FIG. 6, but has a shape so that it can be inserted in a positive locking manner into the recess 26 and contacts the contact surface 25 of the cover electrode 17 in an electrically conducting manner. The recess 26 can be identical to a hole 2 or 3.

Figure 7:
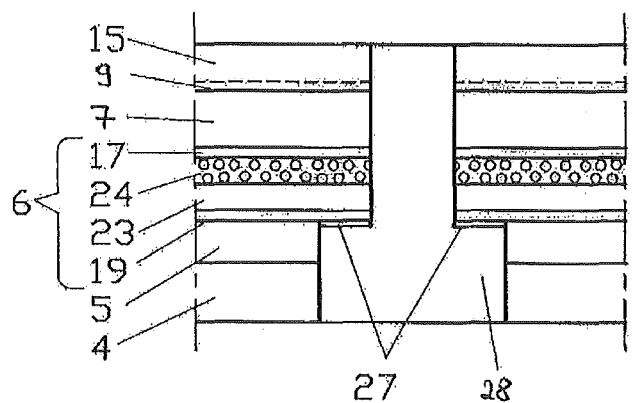
FIG. 7 illustrates the section B in FIG. 5. Section B shows the contacting of the rear electrode.

The section B illustrated in FIG. 5 is described in FIG. 7. The section B shows the contacting of the rear electrode 19. The structure of the electroluminescent arrangement according to the invention is the same as that already described in the previous figures, and consists of an aluminium substrate 4, to which is applied a first adhesive layer 5 of TPU. An electroluminescent arrangement 6 according to the invention is applied to the adhesive layer 5 of TPU, wherein the arrangement 6 consists of the rear electrode 19, a dielectric layer 23, an electroluminescent layer 24 and a cover electrode 17. The cover substrate 7 consisting of a polycarbonate film is in turn applied to the cover electrode 17. A further adhesive layer 9 based on TPU and a reflecting layer in the form of a film 15 are applied to the cover substrate 7. The contacting is effected via the contact surface identified by the reference numeral 27. The contacting element 16b is not illustrated in FIG. 6, but has a shape so that it can be inserted in a positive locking manner into the recess 28 and contacts the contact surface 27 of the rear electrode 19 in an electrically conducting manner. The contacting of the electrodes can be effected by means of a busbar.

Figure 8:
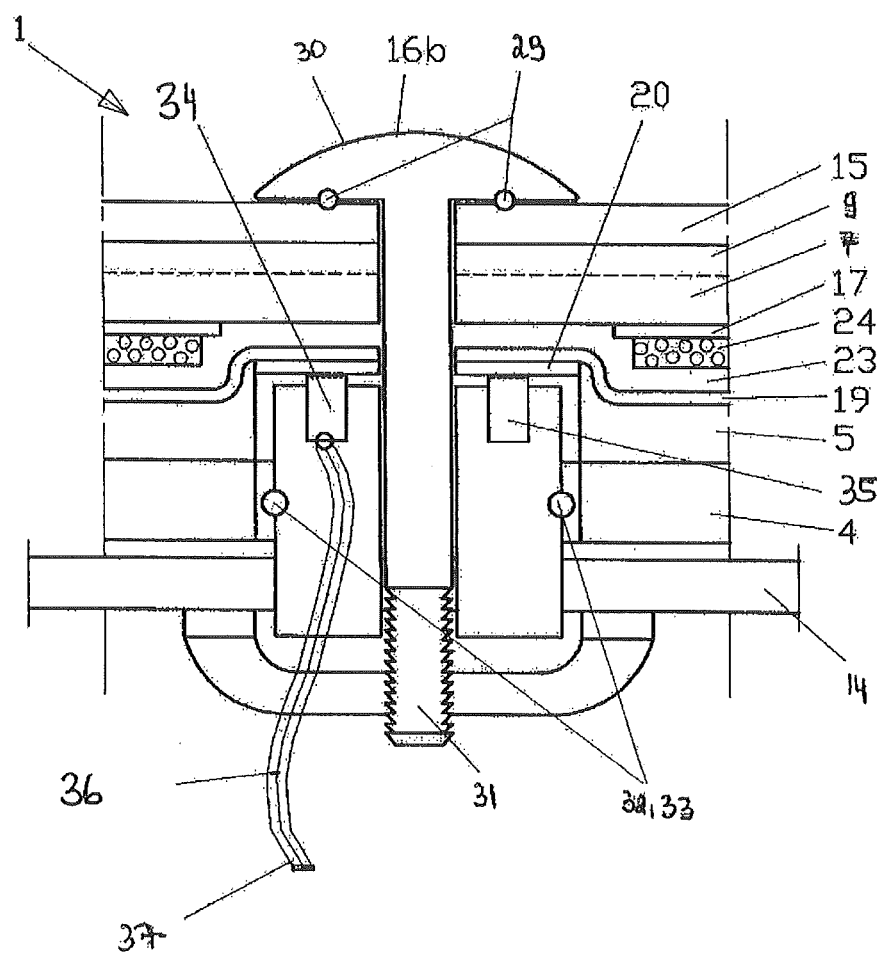
FIG. 8 illustrates the section B in FIG. 5 in another configuration.

In FIG. 8 the section B illustrated in FIG. 5 is shown in another configuration. In this configuration shown in FIG. 8 the electrical contacting of the rear electrode serves at the same time as a mechanical fixing. The section B shows the contacting of the rear electrode 19. The structure of the electroluminescent arrangement according to the invention is the same as that already described in the preceding figures, comprising an aluminium substrate 4, to which is applied a first adhesive layer 5 of TPU. An electroluminescent arrangement 6 according to the invention is applied to the adhesive layer 5 based on TPU, the said arrangement 6 consisting of the rear electrode 19, a dielectric layer 23, an electroluminescent layer 24 and a cover electrode 17. The cover substrate 7 consisting of a polycarbonate film is in turn applied to the cover electrode 17. A further adhesive layer 9 based on TPU and a reflecting layer in the form of a film 15 are applied to the cover substrate 7. The automobile distinguishing sign 1 is arranged in a frame 14. A fastening to the front side of the automobile distinguishing sign 1 is effected with the aid of a sealing O-ring 29 or a flat sealing ring, which is arranged underneath the contacting element 16b. A security embossing 30 is provided on the contacting element 16b, by means of which the code can be verified and in this way for example the validity of the automobile distinguishing sign and the validity of the license and similar security-relevant items can be checked. The automobile distinguishing sign 1 according to the invention is fixed mechanically to the rear side via the contacting element 16b by means of a fastening device 31 in the form of a saw-toothed catch, a rivet or a thread. Further rubber seals 32 and 33 are provided on the contacting element 16b. Contact surfaces 34 and 35 are provided on the contacting element 16b, which are in positive locking contact with the busbar 20 of the rear electrode 19. The current required to operate the electroluminescent arrangement is supplied from an electroluminescence inverter 21 (not shown) via a conducting wire 36 that is insulated by the insulation 37.

In FIG. 9 a self-luminescent automobile distinguishing sign 1 with the alphanumeric identification "BMS-123" is shown by way of example in plan view. In this embodiment two perforations (holes) 2 and 3 are provided for the electrical contacting and the mechanical fastening. The two perforations 2 and 3 can in principle be arranged in virtually any position and are preferably provided on the left-hand and right-hand edges, since in this case an optimal mechanical fastening is also possible and the two electrically conducting flat electrodes 17 and 19 (not shown) can be arranged very conveniently. In this implementation the contacting of the cover electrode 17 occurs in the left-hand hole region and the contacting of the rear electrode 19 occurs in the right-hand hole region. The EL field, shown hatched, extends over almost the whole area, though normally a small edge region remains dark and the region around the two holes is likewise implemented without an EL luminescent field.

In FIG. 10 the self-luminescent distinguishing sign 1 is shown diagrammatically in plan view, wherein simply the cover electrode 17 with the busbar 18 are illustrated. The cover electrode 17 is preferably produced by a screen-printing technique and can thereby be arranged with a high degree of precision. The cover electrode 17 is normally arranged directly adjacent to the graphical printing, including a thin white translucent printing, on a transparent film as cover substrate 7 (not shown), and preferably a small edge region of about 0.5 mm to about 3.0 mm is left free. Similarly, the region surrounding the right hand hole is left free for the implementation of the rear electrode contacting. The cover electrode 17 should be as transparent and as electrically highly conducting as possible, and is preferably designed so that this can be implemented by a largely cold working for the embossing of the distinguishing sign without any crack formation. A busbar 18 is also shown in this FIG. 10, which is arranged in the usual configuration of a busbar with an edge region a few millimetres wide, and in addition in the left-hand hole region covers the contacting region for the cover electrode 17.

In FIG. 11 the self-luminescent distinguishing sign 1 is illustrated diagrammatically in plan view, and in this connection simply the rear electrode 19 with the grid-like busbar is shown. For reasons of cost and functionality a carbon paste with a sheet resistance of typically 5 to 100 Ω/square is preferably used as rear electrode 19. The sheet conductivity of the carbon paste is provided by a silver paste (silver fleece) arranged in the manner of a grid, with a sheet resistance of typically less than 100 mg/square down to less than 20 mg/square, and the silver paste is arranged in the right-hand hole region, and here is intended to improve the contacting of the rear electrode 19. In principle the silver paste can in addition also be arranged along the edges in the manner of the normal arrangement of a busbar. Since in the present case the rear electrode 19 does not have to be made transparent, the grid-like arrangement can be chosen and provides an additional security in the embossing procedure of the distinguishing sign, since normal silver pastes can be cold-worked relatively well and the potentially high resistivity of the carbon paste is avoided. The cold workability of the carbon paste without crack formation and thus without any increase in the specific sheet resistance can in addition be improved by admixing a few tenths of a percent up to a few percent of MWCNTs (multi-walled carbon nanotubes). Conventional MWCNTs already have a length of a few μm and in this way improve the percolation in combination with the conventional graphite particles. The admixture of MWCNTs in the silver paste is likewise helpful and in this connection also improves the workability, without the danger of crack formation leading to a high resistivity. It is important to emphasise that, with a suitable arrangement of the various layers of the EL capacitor, the silver paste impression for the grid-like rear electrode reinforcement can at the same time serve as a busbar for the cover electrode 17 (not shown), and only this one silver paste impression reinforces the electrical conductivity in the region of the two contacting holes 2 and 3. The grid-like silver paste impression can in this connection have virtually any arbitrary graphical configuration and can be executed with a finer grid pattern specifically in the area of the embossing for the distinguishing sign, and need not in particular be formed as a uniform grid, but can be designed having a progressive cross-section. The electrical contacting of the cover electrode 17 (not shown) and of the rear electrode 19 can be effected by means of identical contacting elements. Since the EL element is operated with alternating voltage the polarity does not have to be taken into account. With both contactings a relatively strong surface pressure can be exerted on the silver paste, since the transparent electrically conducting layer is arranged underneath the silver paste in the case of the front electrode, and the carbon paste layer is arranged underneath in the case of the rear electrode. The electrical contacting can therefore be implemented with fine, sharp-edged electrically conducting elements in the manner of a micro-piercing or nano-piercing, as well as in the manner of a crimping.

The invention claimed is:

1. An electroluminescent arrangement, wherein the arrangement comprises the following structure of functional layers:
   (a) rear electrode as component (BE);
   (b) dielectric layer as component (BD);
   (c) electroluminescent layer as component (BC); and
   (d) cover electrode as component (BA),
   wherein electrical connections of the rear electrode and the cover electrode are effected by contacting elements that are formed as a screw connection, rivet connection or sawtooth-shaped connection which are inserted in a positive locking manner into recesses that are formed in the electroluminescent arrangement and wherein the contacting elements have an additional function of mechanically fixing of the electroluminescent arrangement, wherein a further cover substrate is provided on the cover electrode, wherein a layer of a white lacquer is applied to the cover substrate, and wherein a reflecting layer is provided on the layer of the white lacquer.

2. The electroluminescent arrangement according to claim 1, wherein the electroluminescent arrangement is applied via the rear electrode to a rear substrate.

3. The electroluminescent arrangement according to claim 2, wherein the electroluminescent arrangement is connected to the rear substrate via an adhesive layer, which is provided between the rear electrode and the rear substrate.

4. The electroluminescent arrangement according to claim 1, wherein the electroluminescent arrangement is connected to the cover substrate via an adhesive layer, which is provided between the cover electrode and the cover substrate.

5. The electroluminescent arrangement according to claim 3, wherein the adhesive layer system is based on a system comprising silicone, ethylene vinyl acetate, PVC or on a thermoplastic urethane elastomer.

6. The electroluminescent arrangement according to claim 5, wherein the adhesive system is formed as a film.

7. The electroluminescent arrangement according to claim 1, wherein the reflecting layer and/or the cover substrate comprises hollow glass spheres.

8. The electroluminescent arrangement according to claim 7, wherein the hollow glass spheres have a mean diameter of 10 to 200 μm.

9. The electroluminescent arrangement according to claim 1, wherein the composition of the cover electrode and/or the composition of the rear electrode includes multi-walled and/or single-walled carbon nanotubes.

10. The electroluminescent arrangement according to claim 1, wherein the rear electrode and/or the cover electrode are contacted by means of a busbar.

11. The electroluminescent arrangement according to claim 10, wherein the rear electrode is contacted via a busbar that is in electrical contact with the contacting elements.

12. The electroluminescent arrangement according to claim 10, wherein the cover electrode is contacted via a busbar that is in electrical contact with the contacting elements.

13. The electroluminescent arrangement according to claim 1, wherein at least one of the rear electrode or the cover electrode comprises a metal grid or grating.

14. The electroluminescent arrangement according to claim 13, wherein the metal grid consists substantially of a metal, which is selected from the group consisting of silver, copper, gold, platinum, brass, iron and nickel.

15. The electroluminescent arrangement according to claim 14, wherein the metal grid consists substantially of silver.

16. The electroluminescent arrangement according to claim 1, wherein the electroluminescent arrangement is used in the frame of an automobile distinguishing sign.

17. A distinguishing sign for an automobile which comprises the electroluminescent arrangement according to claim 1.

18. A front diaphragm blank comprising the electroluminescent arrangement according to claim 1.

19. A process for producing a front diaphragm blank, which comprises preparing an arcuate format from the electroluminescent arrangement according to claim 1 and the blank is then cut out, stamped out or otherwise fashioned, in a predetermined size from this arcuate format.

20. The process according to claim 19, wherein a multiple impression arcuate format is used in the process.

21. The process according to claim 19, wherein the blank is provided with further security features by means of printing techniques.

22. A distinguishing sign comprising the electroluminescent arrangement according to claim 1, wherein the distinguishing sign is fixed in a frame and the at least two electrical connections are joined to an EL inverter.

23. The electroluminescent arrangement according to claim 13, wherein the metal grid avoids breaks in electrical conductivity of the electrodes of electroluminescent arrangement.

* * * * *